(12) United States Patent
Shibayama et al.

(10) Patent No.: US 7,343,465 B2
(45) Date of Patent: Mar. 11, 2008

(54) STORAGE SYSTEM

(75) Inventors: Tsukasa Shibayama, Yokohama (JP); Yukinori Sakashita, Sagamihara (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 11/186,895

(22) Filed: Jul. 22, 2005

(65) Prior Publication Data

US 2006/0271754 A1 Nov. 30, 2006

(30) Foreign Application Priority Data

May 27, 2005 (JP) .............................. 2005-155224

(51) Int. Cl.
*G06F 12/12* (2006.01)

(52) U.S. Cl. ...................... 711/170; 711/114; 711/202; 709/216

(58) Field of Classification Search ................ 711/170, 711/114, 202; 709/216
See application file for complete search history.

(56) References Cited

U.S. PATENT DOCUMENTS

| | | | |
|---|---|---|---|
| 4,916,605 A * | 4/1990 | Beardsley et al. .......... 711/162 |
| 5,542,066 A * | 7/1996 | Mattson et al. ............. 711/136 |
| 6,108,748 A | 8/2000 | Ofek et al. | |
| 6,772,161 B2 * | 8/2004 | Mahalingam et al. ......... 707/10 |
| 2003/0221063 A1 | 11/2003 | Eguchi et al. | |
| 2004/0260861 A1 | 12/2004 | Serizawa et al. | |
| 2005/0120175 A1 * | 6/2005 | Shimada et al. ............ 711/114 |

FOREIGN PATENT DOCUMENTS

| | | |
|---|---|---|
| JP | 2003-345522 | 12/2003 |
| JP | 2005-11316 | 1/2005 |

* cited by examiner

*Primary Examiner*—Jack Lane
(74) *Attorney, Agent, or Firm*—Mattingly, Stanger, Malur & Brundidge, P.C.

(57) ABSTRACT

Use a storage system having a first data storage unit. The first data storage unit has a temporary storage area which is prepared in advance for the purpose of being provided to a host computer. Prior to completion of a process of creating a normal storage area within a second data storage unit in response to a storage area allocation request, the temporary storage area is associated with access point information for specifying access point in response to the allocation request. The access point information is to be used by the host computer to access the normal storage area. Then prior to completion of the normal storage area creation process, an access by an access request including the access point information from the host computer is relayed to the temporary storage area associated with the access point information.

17 Claims, 20 Drawing Sheets

Fig.6

CONFIGURATION MANAGEMENT TABLE 224

| HOST WWN | RAID LEVEL | VOLUME SIZE | LUN | MIGRATION STATUS |
|---|---|---|---|---|
| 10:00:00:00:87:·· | RAID5(4D+1P) | 50G | 00 | BEFORE MIGRATION |
| 10:00:00:10:2D:·· | RAID5(7D+1P) | 150G | 01 | BEFORE MIGRATION |
| 10:00:00:0C:CA:·· | RAID5(7D+1P) | 800G | 02 | MIGRATION COMPLETED |
| ∘ ∘ | ∘ ∘ | ∘ ∘ | ∘ ∘ | ∘ ∘ |

AREA DISCRIMINATION TABLE FOR TEMPORARY VOLUME 327

| STORAGE AREA TYPE | LEAD SECTOR | SIZE |
|---|---|---|
| CACHE | 0 | 50G |
| CACHE | 15000000 | 150G |
| ∘ ∘ | ∘ ∘ | ∘ ∘ |

IDENTIFIER CONVERT TABLE 326

| IDENTIFIER | VOLUME TYPE | STORAGE AREA TYPE | LEAD SECTOR | SIZE | |
|---|---|---|---|---|---|
| #1 | TEMPORARY | CACHE | 0 | 50G | TV1 (Sr440) |
| #A | NORMAL | DISK ARRAY (LOGICAL VOLUME NO. =1) | 0 | 50G | NV1(LV1) (Sr910) |
| ⋮ | ⋮ | ⋮ | ⋮ | ⋮ | |

Fig.9

VOLUME MAPPING TABLE 325

| TEMPORARY VOLUME IDENTIFIER | NORMAL VOLUME IDENTIFIER | DATA MIGRATION STATUS | LUN | MIGRATION POINTER (MIGRATION DATA TAIL SECTOR) | WRITTEN SECTOR | |
|---|---|---|---|---|---|---|
| #1 | #A | BEFORE MIGRATION | 00 | - | - | TV1,NV1 |
| ⋮ | ⋮ | ⋮ | ⋮ | ⋮ | ⋮ | |

| ↑ | ↑ | ↑ | ↑ | ↑ | ↑ |
|---|---|---|---|---|---|
| Sr440 | Sr910 | Sr440 Sr954 Sr964 | Sr640 | Sr954 | Sr1130 |

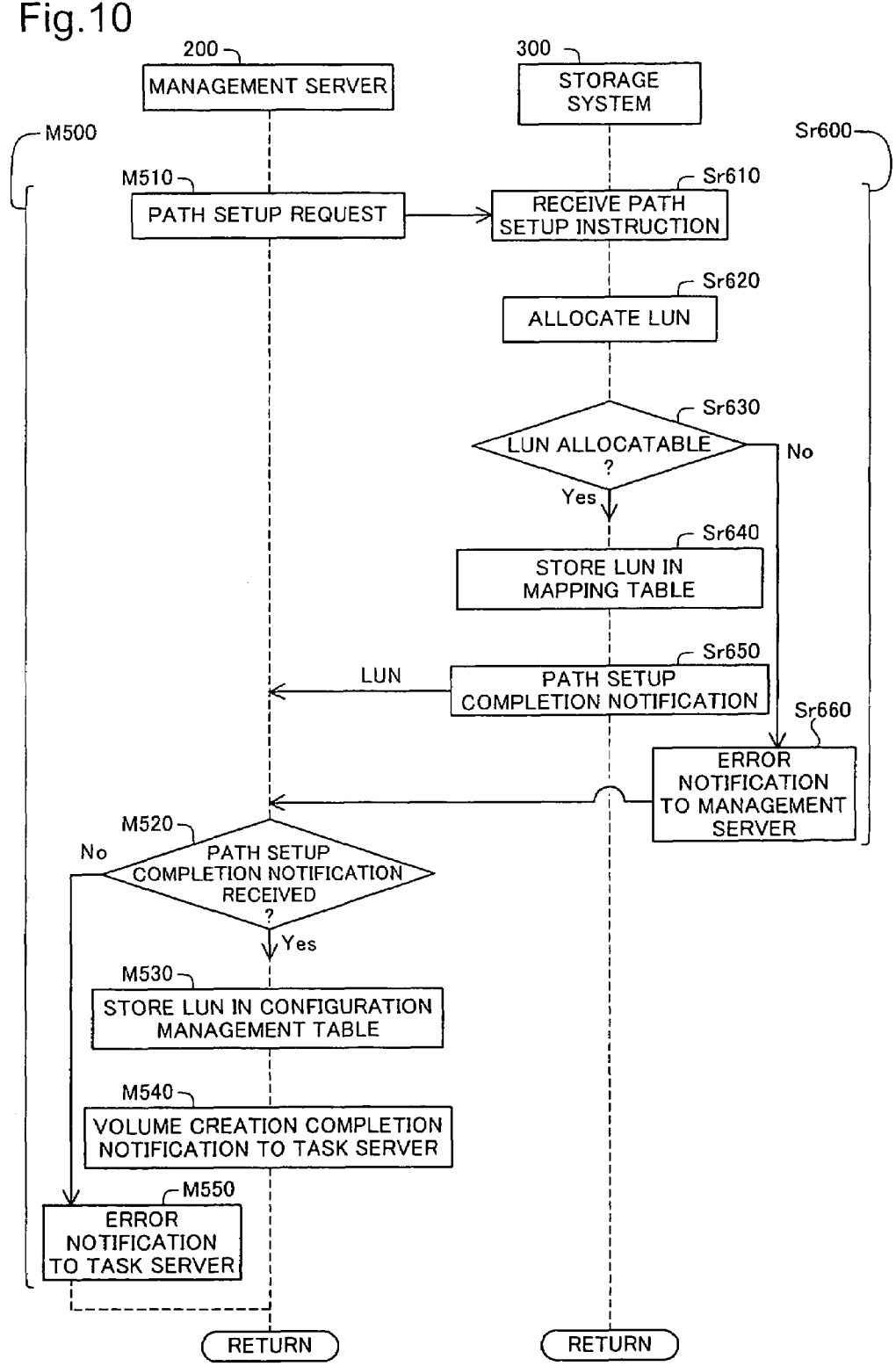

WRITE PROCESS DURING MIGRATION

Fig.18

AREA DISCRIMINATION TABLE FOR TEMPORARY VOLUME 327b

| STORAGE AREA TYPE | IDENTIFICATION NO. | LEAD SECTOR | SIZE |
|---|---|---|---|
| CACHE | – | 0 | 50G |
| CACHE | – | 15000000 | 100G |
| DISK ARRAY | VOLUME NO.=3 | 0 | 150G |
| DISK ARRAY | VOLUME NO.=4 | 0 | 800G |
| ⋮ | ⋮ | ⋮ | ⋮ |

IDENTIFIER CONVERT TABLE 326

| IDENTIFIER | VOLUME TYPE | STORAGE AREA TYPE | LEAD SECTOR | SIZE |
|---|---|---|---|---|
| #1 | TEMPORARY | CACHE | 0 | 50G |
| #A | NORMAL | DISK ARRAY (LOGICAL VOLUME NO. =1) | 0 | 50G |
| #2 | TEMPORARY | DISK ARRAY (LOGICAL VOLUME NO. =3) | 0 | 150G |
| #B | NORMAL | DISK ARRAY (LOGICAL VOLUME NO. =2) | 0 | 150G |

VOLUME MAPPING TABLE 325

| TEMPORARY VOLUME IDENTIFIER | NORMAL VOLUME IDENTIFIER | DATA MIGRATION STATUS | LUN | MIGRATION POINTER (MIGRATION DATA TAIL SECTOR) | WRITTEN SECTOR |
|---|---|---|---|---|---|
| #1 | #A | BEFORE MIGRATION | 00 | – | – |
| #2 | #B | BEFORE MIGRATION | 01 | – | – |
| ⋮ | ⋮ | ⋮ | ⋮ | ⋮ | ⋮ |

TV3,NV2

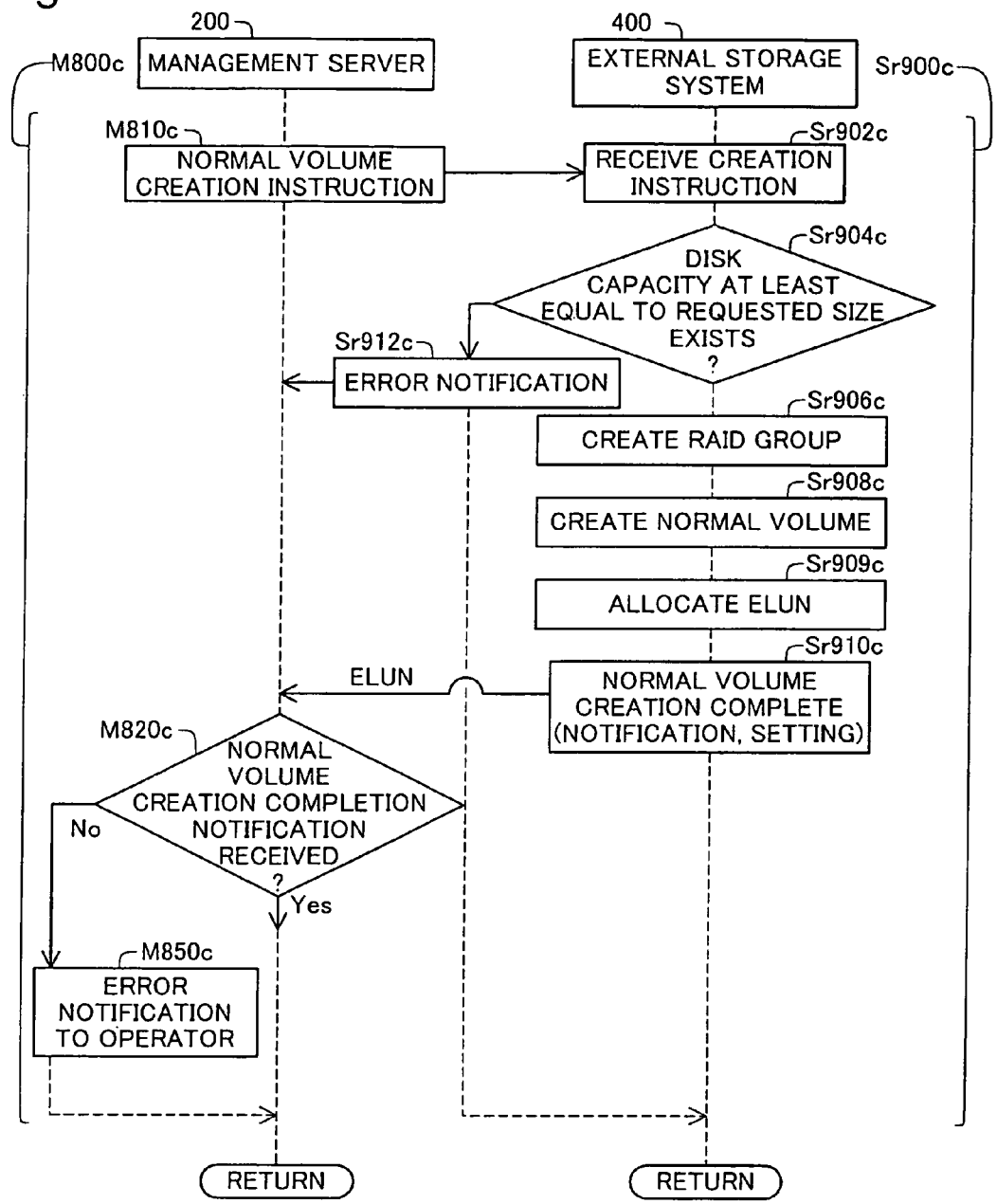

Fig.25

EXTERNAL VOLUME MAPPING TABLE 328

| INTERNAL LOGICAL VOLUME NO | EXTERNAL PORT WWN | EXTERNAL STORAGE SYSTEM LUN (ELUN) |
|---|---|---|
| 5 | 10:00:00:24:... | 03 |
| 6 | 10:00:00:34:... | 04 |
| 7 | 10:00:00:F4:... | 07 |

ENV1(ELV1) (Sr952c) 

Fig.26

IDENTIFIER CONVERT TABLE 326

| IDENTIFIER | VOLUME TYPE | STORAGE AREA TYPE | LEAD SECTOR | SIZE |
|---|---|---|---|---|
| #1 | TEMPORARY | CACHE | 0 | 50G |
| #C | NORMAL | DISK ARRAY (LOGICAL VOLUME NO. = 5) | – | – |
| ⋮ | ⋮ | ⋮ | ⋮ | ⋮ |

TV1 

ENV1 (LV5,ELV1) (Sr952c) 

Fig.27

VOLUME MAPPING TABLE 325

| TEMPORARY VOLUME IDENTIFIER | NORMAL VOLUME IDENTIFIER | DATA MIGRATION STATUS | LUN | MIGRATION POINTER (MIGRATION DATA TAIL SECTOR) | WRITTEN SECTOR |
|---|---|---|---|---|---|
| #1 | #C | BEFORE MIGRATION | 00 | – | – |
| ⋮ | ⋮ | ⋮ | ⋮ | ⋮ | ⋮ |

TV1,ENV1 

STORAGE SYSTEM

CROSS-REFERENCE TO RELATED APPLICATIONS

The present application claims the priority based on Japanese Patent Application No. 2005-155224 filed on May 27, 2005, the disclosure of which is hereby incorporated herein by reference in its entirety.

BACKGROUND

The present invention relates to a storage system providing a data storage area to a host computer.

In recent years, storage systems that provide data storage areas to host computers have become widespread. In such a storage system, a RAID (Redundant Array of Inexpensive Disks) system is used in order to improve reliability in relation to disk device failure, or to improve data transfer speeds (See, for example, U.S. Patent Published Application Nos. 2003/221063, and 2004/260861, and U.S. Pat. No. 6,108,748). Various different types of data recording format (also termed "RAID levels") exist in a RAID system.

In order for a storage system to provide storage areas that match an application of the host computer, in some instances, the RAID level or other such storage area configuration is determined in response to a request of the host computer, and creation of the storage areas is carried out. As a result, there are instances in which provision of storage areas to the host computer is time consuming. For example, when creating storage areas using a RAID 5 system, parity write process is carried out. In this case, a storage area is provided after waiting for the parity write process to complete.

This problem is not limited to RAID 5 systems, but it is common to instances in which other RAID level systems are used. Furthermore this problem is not limited to storage systems that use RAID systems, but it is common to storage systems that create storage areas by means of executing processes of writing data.

SUMMARY OF THE INVENTION

An object of the present invention is to provide a technology that enables reduction of the time required to provide storage areas to a host computer.

In a first aspect of the present invention, there is provided a computer system having a storage system which provide a host computer with a storage area that stores data. The storage system has a first data storage unit, a storage area setup unit, and a data relay unit. The first data storage unit has a temporary storage area which is prepared in advance for the purpose of being provided to the host computer. The storage area setup unit associates the temporary storage area with access point information for specifying access point for the host computer in response to a given storage area allocation request, prior to completion of a process of creating a normal storage area within a second data storage unit in response to the allocation request. The access point information is to be used by the host computer to access the normal storage area. The data relay unit relays an access by an access request including the access point information from the host computer to the temporary storage area associated with the access point information, prior to completion of the normal storage area creation process.

According to this computer system, a temporary storage area is provided to the host computer prior to completion of the process of creating a normal storage area, whereby it is possible to reduce the time needed to provide a storage area to the host computer.

In a second aspect of the present invention, there is provided a storage system for providing a host computer with a storage area that stores data. The storage system has a CPU, a temporary storage unit, a plurality of disk devices, and a host interface configured to carry out data communications with the host computer. The temporary storage unit has a temporary storage area which is prepared in advance for the purpose of being provided to the host computer. The CPU is connected to the temporary storage unit, the plurality of disk devices, and the host interface, respectively. The CPU executes associating the temporary storage area with access point information for specifying access point for the host computer in response to a given storage area allocation request, prior to completion of a process of creating a normal storage area within the plurality of disk devices in response to the allocation request. The access point information is to be used by the host computer to access the normal storage area. Then the CPU executes accessing the temporary storage area associated with the access point information in response to an access request including the access point information from the host computer, prior to completion of the normal storage area creation process.

According to the storage system pertaining to the second aspect as well, since a temporary storage area is provided to the host computer prior to completion of the process of creating a normal storage area, it is possible to reduce the time needed to provide a storage area to the host computer.

The present invention may be reduced to practice in various embodiments, for example, a method and a device for providing storage areas; a computer program for realizing the functions of such methods or devices; a recording medium having such a computer program recorded thereon; a data signal containing the computer program and embodied in a carrier wave, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 6 is an illustration depicting an example of the configuration management table 224;

FIG. 7 is an illustration depicting an example of the discrimination table 327;

FIG. 8 is an illustration depicting an example of the identifier convert table 326;

FIG. 9 is an illustration depicting an example of the volume mapping table 325;

FIG. 10 is a flowchart showing the specifics of the procedure of Steps M500, Sr600 of FIG. 2;

FIG. 18 is an illustration depicting an example of the discrimination table 327b in Embodiment 2;

FIG. 19 is an illustration depicting an example of the identifier convert table 326 in Embodiment 2;

FIG. 20 is an illustration depicting an example of the volume mapping table 325 in Embodiment 2;

FIG. 22 is a flowchart showing the procedure of the normal volume creation process;

FIG. 23 is an illustration depicting an example of the volume table 426;

FIG. 25 is an illustration depicting an example of the external volume mapping table 328;

FIG. 26 is an illustration depicting an example of the identifier convert table 326 in Embodiment 3; and FIG. 27 is an illustration depicting an example of the volume mapping 325 table in Embodiment 3.

DESCRIPTION OF THE PREFERRED EMBODIMENT

A description of the embodiments of the invention follows, in the order indicated below.
A. Embodiment 1:
B. Embodiment 2:
C. Embodiment 3:
D. Variants:

A. Embodiment 1

Figure 1:
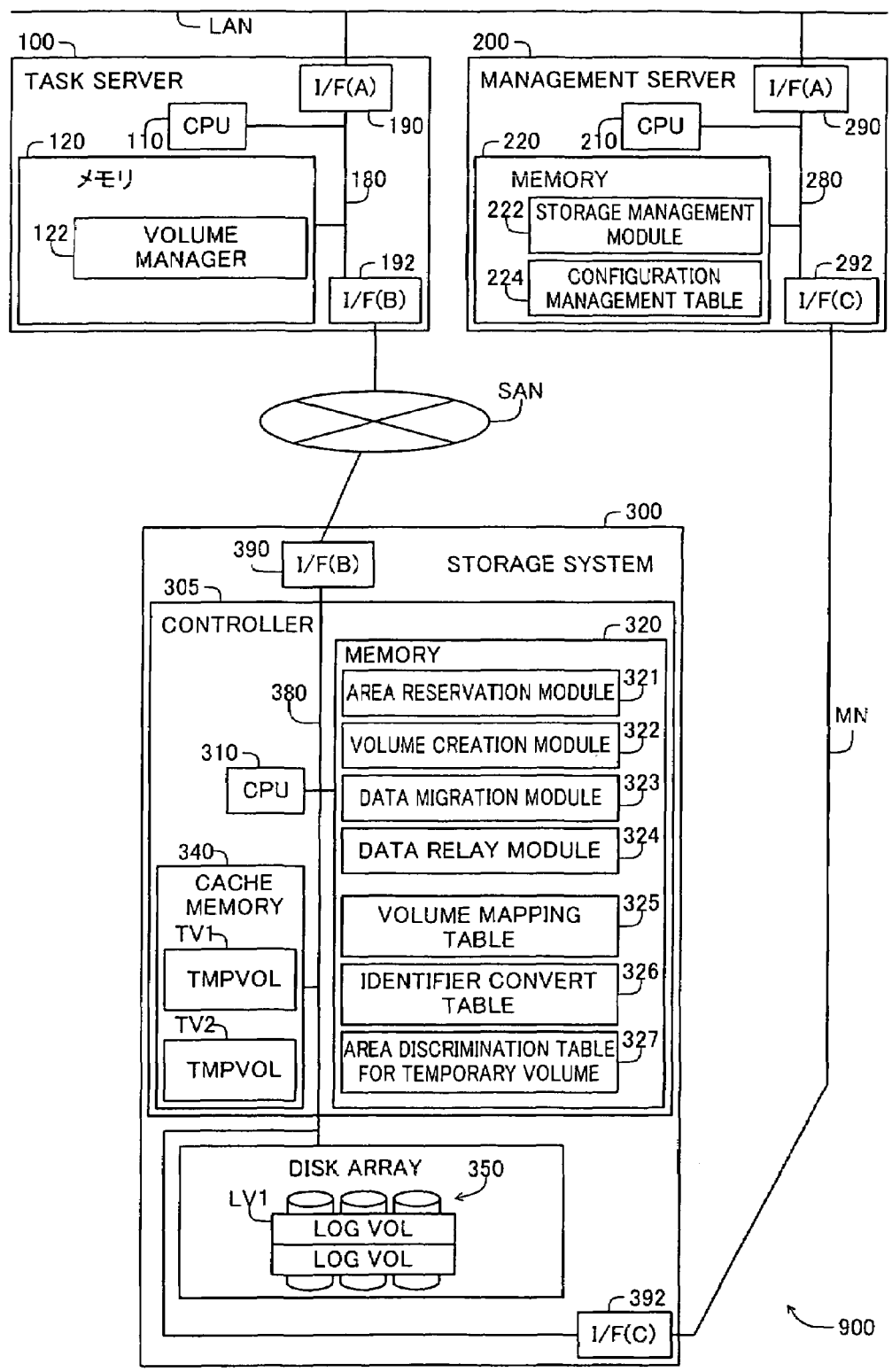
FIG. 1 is an illustration depicting the arrangement of a data processing system in a first embodiment of the invention.

A1. System Arrangement:

FIG. 1 is an illustration depicting the arrangement of a data processing system in a first embodiment of the invention. The data processing system 900 has a task server 100, a management server 200, and a storage system 300. The task server 100 and the storage system 300 are each connected to a Storage Area Network (SAN). The management server 200 is connected to the storage system 300 via a management network MN. The task server 100 and the management server 200 are each connected to a Local Area Network (LAN).

The task server 100 achieves certain functions while utilizing data storage areas (described later) provided by the storage system 300. As functions of the task server 100, there are, for example, functions as a file server to provide data files to a client device (not shown), and functions as a database server to control a variety of data.

The task server 100 has a CPU (central processing unit) 110, a memory 120, an interface 190 for connection to the Local Area Network LAN, and an interface 192 for connection to the Storage Area Network SAN. These elements are interconnected via a bus 180. The functions of the task server 100 are achieved by means of execution of programs by the CPU 110. The memory 120 stores the data and programs used by the CPU 110. In particular, the memory 120 has a volume manager 122. The volume manager 122 is a program executed by the CPU 110 (described in detail later).

The management server 200 has various functions for controlling the operation of the storage system 300 (these will be described in detail later). By means of controlling the management server 200, the administrator (operator) of the storage system 300 can establish operational settings of the storage system 300. The storage system 300 and the management server 200 can be termed as "storage management system" in the broad sense.

The management server 200 has a CPU 210, a memory 220, an interface 290 for connection to the Local Area Network LAN, and an interface 292 for connection to the management network MN. These elements are interconnected via a bus 280. The functions of the management server 200 are achieved by means of execution of programs by the CPU 210. The memory 220 stores the data and programs used by the CPU 210. In particular, the memory 220 has a storage management module 222 and a configuration management table 224. The storage management module 222 is a program executed by the CPU 210. The management server 200 will be described in detail later.

The storage system 300 provides data storage areas to the task server 100. The storage system 300 has a controller 305, a disk array 350, an interface 390 for connection to the Storage Area Network SAN, and an interface 392 for connection to the management network MN. These elements are interconnected via a bus 380. The disk array 350 has a plurality of disk devices. The controller 305 has a CPU 310, a memory 320, and a cache memory 340. The cache memory 340 is a semiconductor memory for temporary storage of data being transferred between the disk array 350 and the task server 100, and is separate from the processor cache memory (not shown) for exclusive use of the CPU 310. A temporary storage volume is created in the cache memory 340 (described in detail later). The memory 320 stores data and programs used by the CPU 310 for various processes.

The memory 320 has an area reservation module 321, a volume creation module 322, a data migration module 323, a data relay module 324, a volume mapping table 325, an identifier convert table 326, and an area discrimination table for temporary volume 327. Each module is a program executed by the CPU 310. Module functions and tables will be described in detail later.

Figure 2:
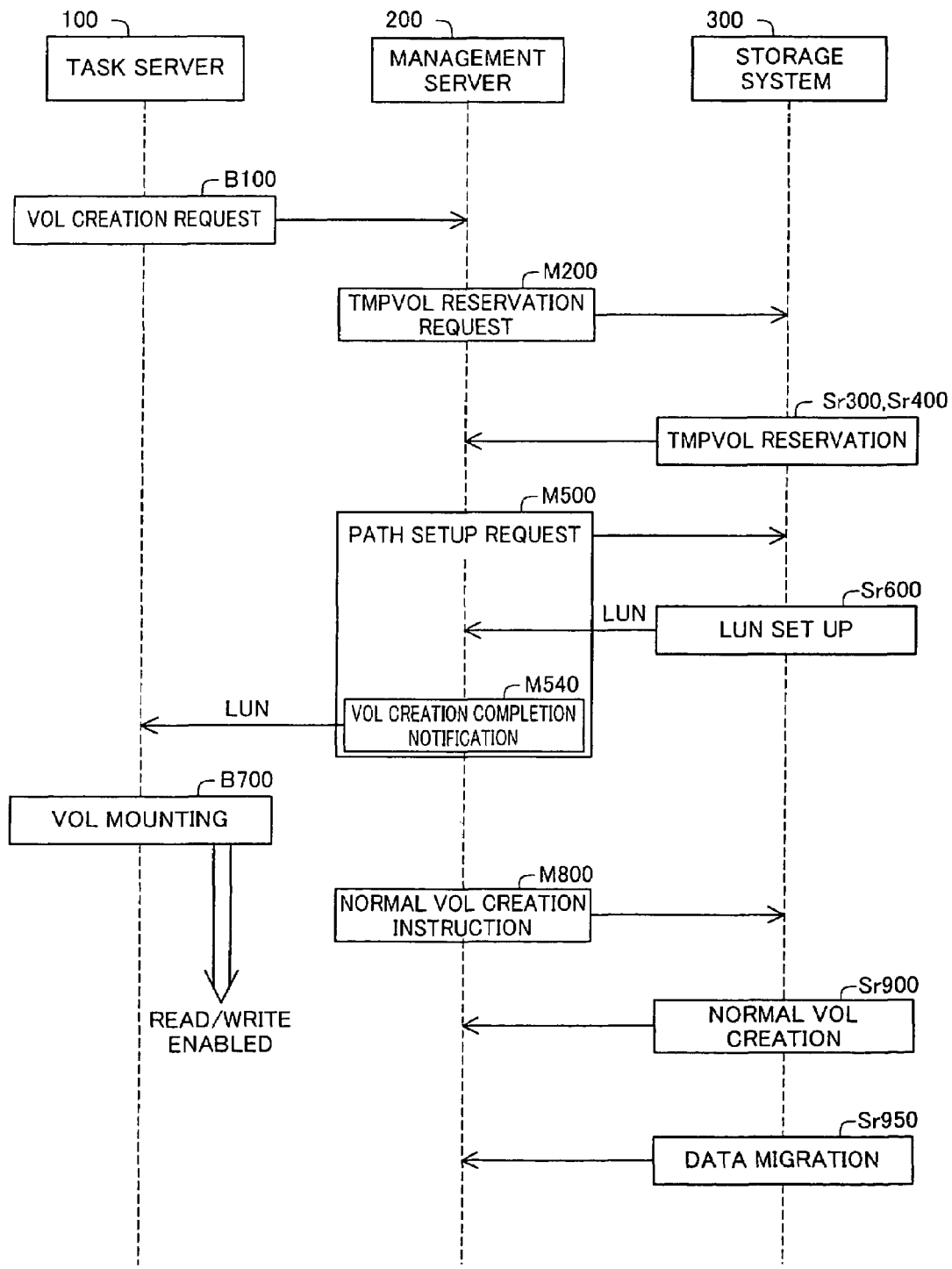
FIG. 2 is a flowchart showing the procedure of the process by which the storage system 300 provides a storage area.

A2. Overview of Storage Area Provision Process:

FIG. 2 is a flowchart showing the procedure of the process by which the storage system 300 provides storage areas to the task server 100. This flowchart shows a schematic view of the storage area provision process.

In the initial Step B100 (FIG. 2), the task server 100 sends to the management server 200 a request to create a storage area (this corresponds to an "allocation request"). At this time, specification of the storage area size (hereinafter termed "requested size") and RAID level (hereinafter termed "requested RAID level") is sent. In the following Step M200, the management server 200 sends to the storage system 300 a reservation request for a temporary volume, which is a temporary storage area. Thereupon, the storage system 300 reserves some of the free space of the cache memory 340 (FIG. 1) as a temporary volume TV1 (Steps Sr300, Sr400).

Figure 3A:
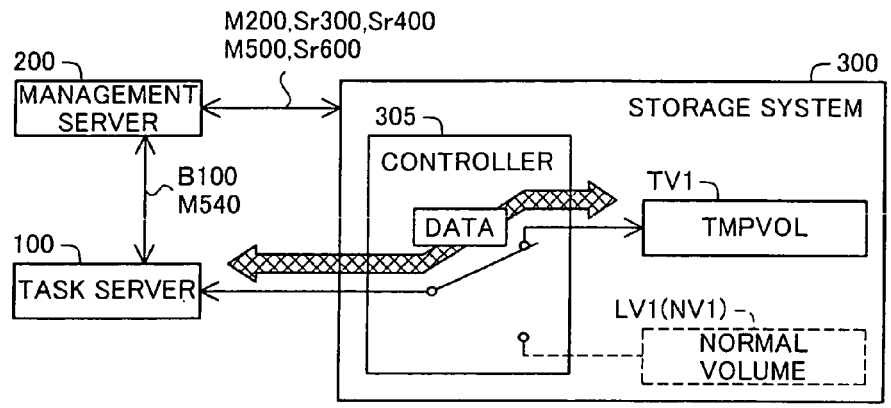
FIGS. 3A-3C are illustrations depicting the storage system 300 providing a storage area.

FIG. 3A is an illustration depicting the storage system 300 providing a temporary volume TV1.

The temporary volume TV1 is a type of logical volume provided by the storage system 300. A logical volume is a data storage area that includes a plurality of logical blocks. A logical block is the smallest unit of data transfer targeting a logical volume. Each logical block is identified by a unique logical block address (hereinafter denoted as "LBA"). The LBA can be considered to represent a data storage location within a logical volume. In Embodiment 1, as LBAs, serial numbers beginning with "0" are employed. Hereinafter, logical volumes will be referred to simply as "volumes." Logical blocks will be referred to simply as "blocks" or "sectors." LBAs will also be referred to as "sector numbers."

In the next Step M500, the management server 200 sends a path setup request to the storage system 300. Path setup is a process for establishing a data transfer path between the task server 100 and a logical volume. Here, a logical volume useable by the task server 100 will be termed a "logical unit." Such logical units are identified by means of a logical unit number (hereinafter denoted as "LUN") unique to each logical unit. In the next Step Sr600, the storage system 300 executes a path setup process targeting the temporary volume TV1. At this time, a LUN is allocated to the temporary volume TV1, and notification of this LUN (hereinafter termed "allocated LUN") is sent to the management server 200.

In the next Step M540, the management server 200 having received notice of the allocated LUN sends to the task server 100 acknowledgement of completion of volume creation, and the allocated LUN. Thereupon, in the next step B700, the task server 100 executes the mounting process for the allocated LUN. Subsequently the task server 100, by means of specifying the allocated LUN, can request the storage system 300 for access to the storage area. Step B700 may be executed at any time after completion of Step M540. Steps following Step M800 will be described later.

FIG. 3A depicts the task server 100 requesting the storage system 300 for access specified by an allocated LUN. In this stage, the access request specified by the allocated LUN is relayed by the controller 305, as an access request targeted to the temporary volume TV1.

Next, in Step M800 (FIG. 2), the management server 200 sends a normal logical volume (hereinafter "normal volume") creation instruction to the storage system 300. Thereupon, in the next Step Sr900, the storage system 300 executes a normal volume creation process. Here, a normal volume refers to a volume associated with an allocated LUN; in contrast to a temporary volume which is used on a temporary basis, a normal volume is used on an ongoing basis.

Figure 3B:
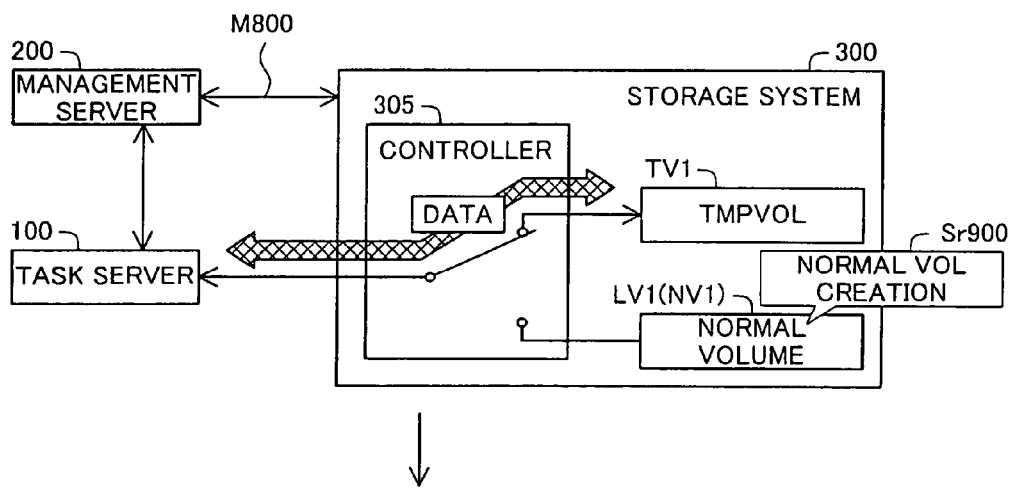

FIG. 3B depicts the storage system 300 creating a normal volume. In Step M800 (FIG. 2), the management server 200 sends the requested size and requested RAID level specified by the task server 100. Then, in the next Step Sr900, the storage system 300, in accordance with the requested size and requested RAID level, creates a normal volume in the disk array 350 (FIG. 1). For example, in the event that RAID 5 is specified, a normal volume is created by means of the parity write process. In the example of FIG. 3B, a first logical volume LV1 is created. This first logical volume LV1 in its entirety is used as a normal volume NV1.

In the next Step Sr950 (FIG. 2), the storage system 300 migrates to the first logical volume LV1 the data stored in the temporary volume TV1.

Figure 3C:
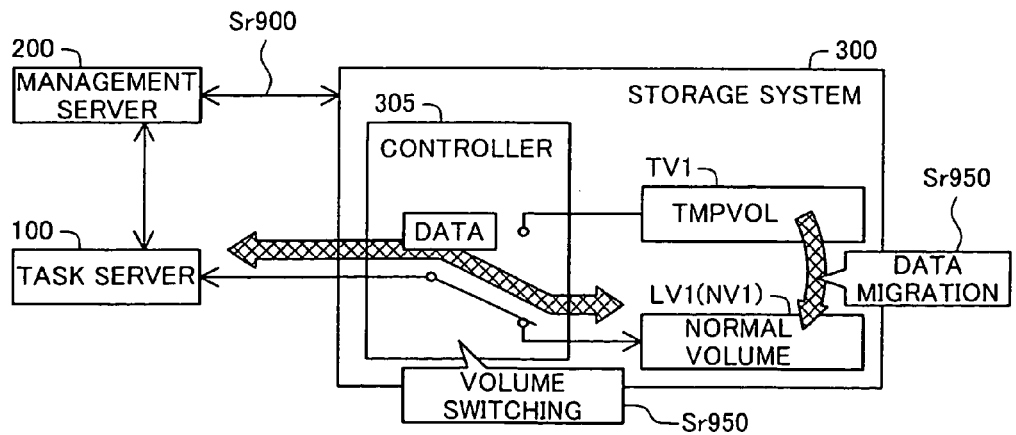

FIG. 3C depicts the storage system 300 after completion of migration of data to the first logical volume LV1. Once data migration is complete, the storage system 300 switches the volume associated with the allocated LUN from the temporary volume TV1 to the first logical volume LV1. Subsequently, any access request from the task server 100 specifying the allocated LUN is relayed by the controller 305 as access targeted to the first logical volume LV1. In this way, the LUN corresponds to the "access point information for specifying access point" of the invention. The controller 305 is able to relay access requests even during data migration. The specifics will be described later.

Prior to completion of creation of the normal volume NV1 (first logical volume LV1), the storage system 300 of Embodiment 1 provides the task server 100 with a temporary volume TV1. As a result, it is possible to reduce the time needed to provide the task server 100 with storage area. In particular, where a large capacity storage area is provided, it is common for normal volume creation to take considerable time. In such instances as well, it is possible for the storage system 300 to rapidly initiate provision of a storage area to the task server 100.

Figure 4:
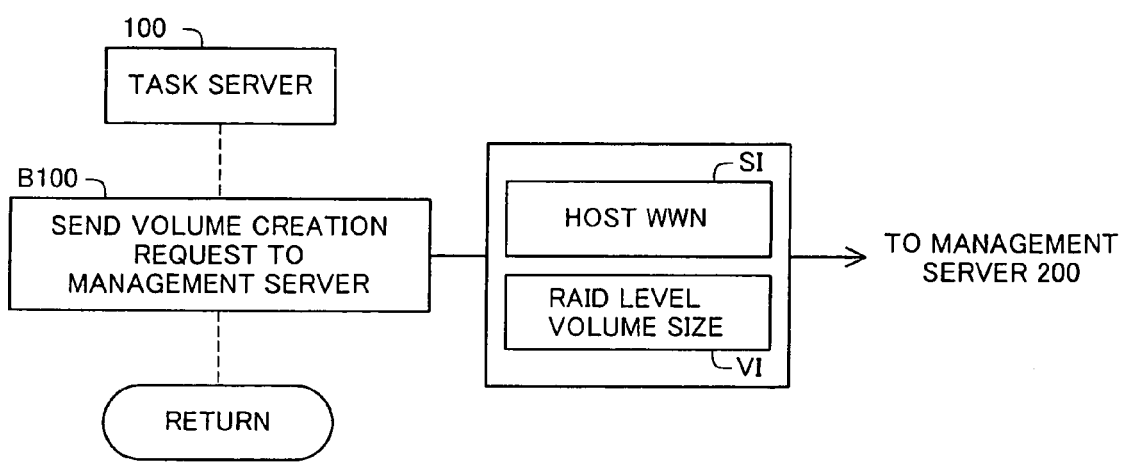
FIG. 4 is an illustration depicting data sent to the management server 200.

A3. Specifics of Storage Area Provision Process:

FIG. 4 is an illustration depicting information sent to the management server 200 in Step B100 of FIG. 2. In Step B100, the volume manager 122 (FIG. 1: task server 100) sends a storage area creation request to the management server 200. At this time, volume information VI and server information SI are sent. The volume information VI includes the RAID level and the volume size. The server information SI includes the WWN (World Wide Name) of the task server 100 (interface 192). A WWN is an ID number that identifies a device (more specifically, an interface) connected to a storage area network SAN. In communications via a SAN, the WWN is used by devices to identify one another.

Figure 5:
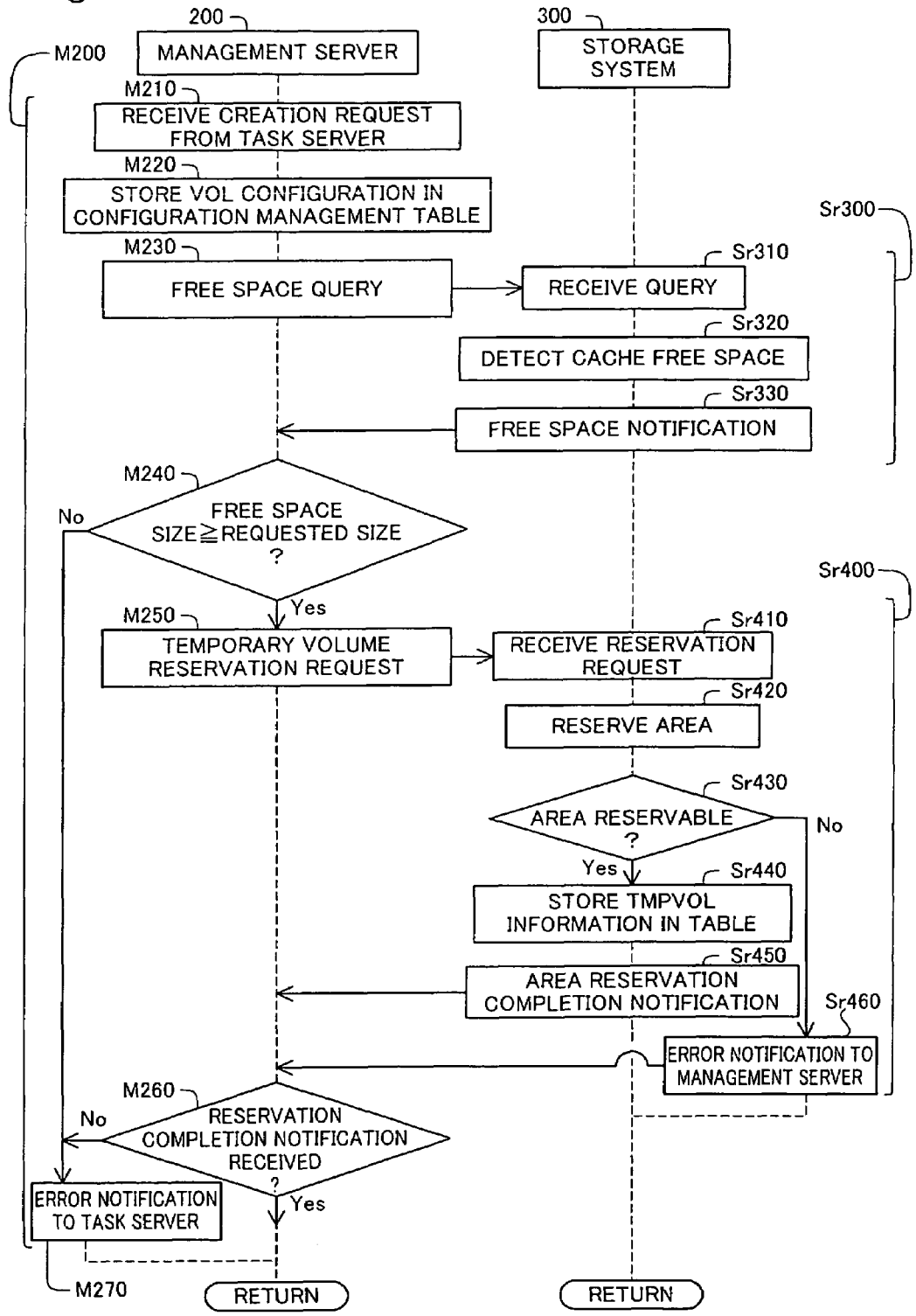
FIG. 5 is a flowchart showing the specific procedure of Steps M200, Sr300, and Sr400 of FIG. 2.

FIG. 5 is a flowchart showing the specific procedure of Steps M200, Sr300, and Sr400 of FIG. 2. In the initial Step M210, the storage management module 222 in the management server 200 (FIG. 1) receives a storage area creation request including server information and volume information from the volume manager 122 in the task server 100. In the next Step M220, the storage management module 222 stores the received server information and volume information in the configuration management table 224. FIG. 6 is an illustration depicting an example of the configuration management table 224. This configuration management table 224 stores associations among task server WWN (host WWN), RAID level, volume size, LUN, and migration status. The unit for volume size is the "byte." Migration status is set to "before migration." LUN is set afterwards. The following description assumes that the storage management module 222 receives the creation request R1 shown in the first row in the example in FIG. 6.

In the next Step M230, the storage management module 222 (FIG. 1) queries the storage system 300 regarding the size of the free space of the cache memory 340. Thereupon, the area reservation module 321 in the storage system 300 receives the query in Step Sr310, and in the following Step Sr320 acquires the size of the free space of the cache memory 340.

In Embodiment 1, information relating to areas reserved as temporary volumes within the cache memory 340 is stored in the discrimination table for temporary volume 327

(hereinafter termed also "discrimination table 327") (described in detail later). The area reservation module 321 refers to the discrimination table 327 in order to acquire the size of the free space. At this time, the presence of any areas used by other applications (e.g. temporary storage of transfer data) is detected as well. The memory 320 stores cache utilization status information representing correspondence between data storage locations in the cache memory 340 and information indicating whether or not they are in use (not illustrated). Once the free space size has been detected, the free space size is sent to the management server 200 in the next Step Sr330.

In Step M240 (FIG. 5), the storage management module 222 (FIG. 1) determines whether the free space size is not smaller than the requested size. In the event that the free space size is smaller than the requested size, in Step M270, the storage management module 222 sends an error message to the task server 100 and terminates the process. Here, the storage management module 222 may notify the operator of the error, rather than the task server 100. For example, an error message may be displayed on the monitor (not shown) of the management server 200, or a warning tone may be output from a speaker (not shown) of the management server 200. By so doing, the operator may take appropriate measures.

In the event that free space size is not smaller than the requested size, in the next Step M250, the storage management module 222 (FIG. 1) sends a temporary volume reservation request to the storage system 300. Thereupon, the area reservation module 321 receives the reservation request in Step Sr410, and reserves a temporary volume in Step Sr420. Specifically, the area reservation module 321 selects from the free space of the cache memory 340 a storage area of the requested size. Here, if reservation could not be made (Step Sr430: No), in the next Step Sr460, the area reservation module 321 sends an error message to the task server 100 and terminates Step Sr400. An instance in which reservation cannot be made could occur, for example, in the event that the free space of the cache memory 340 is reduced due to data transfer, after detection of the free space (Sr320).

Once a storage area of the requested size has been selected, the area reservation module 321, in the next Step Sr440, stores information relating to the selected storage area (the first temporary volume TV1) in the discrimination table 327 (FIG. 1), the identifier convert table 326, and the volume mapping table 325.

FIG. 7 is an illustration depicting an example of the discrimination table 327. The discrimination table 327 stores information relating to temporary volumes. Specifically, it stores storage area type, lead sector, and size. In Embodiment 1, the storage area type is set to "cache." This means that the temporary volume has been created in cache memory 340. Lead sector and size specifies the location of the temporary volume in the cache memory 340. In Embodiment 1, the entire cache memory 340 is treated as a storage area that contains a plurality of sectors. Sectors in the cache memory 340 are identified by a unique cache sector number assigned to each sector. In Embodiment 1, serial numbers beginning at "0" are used as cache sector numbers. The lead sector in the discrimination table 327 represents the cache sector number of the first sector of the temporary volume. The unit of size is bytes. Typically, a data storage location in the cache memory 340 is managed by a memory address different from the cache sector number. Associations of such memory addresses with cache sector numbers (not shown) are also stored in the memory 320.

In Step Sr440, the area reservation module 321 stores in the discrimination table 327 information relating to the first temporary volume TV1. In the example of FIG. 7, the first temporary volume TV1 is a partial area equivalent to 50 Gbytes, beginning from sector #0 in the cache memory 340. In the example of FIG. 7, information relating to a second temporary volume TV2 is stored as well. This second temporary volume TV2 has been reserved in response to another storage area creation request. The second temporary volume TV2 is partial area equivalent to 150 Gbytes, beginning from sector #15000000.

FIG. 8 is an illustration depicting an example of the identifier convert table 326. This table 326 is a table that associates logical volumes with identifiers. Specifically, this identifier convert table 326 stores identifiers that identify logical volumes, in association with logical volume type, storage area type, lead sector, and size. Logical volume type is set to one of "temporary" and "normal." Storage area type represents the type of device in which the volume is created. Lead sector and size represent the location of the volume identified by the identifier. The unit of size is bytes.

In the example of FIG. 8, the area reservation module 321 has allocated identifier "#1" to the first temporary volume TV1. Information relating to the first temporary volume TV1 is stored as the information relating to the logical volume identified by identifier "#1." Specifically, the volume type is set to "temporary" and the storage area type is set to "cache." In Embodiment 1, in the event that the type of storage area is "cache", the lead sector represents the cache sector number of the lead sector. Given this, the lead sector is set to "0" which is the same as the value of the discrimination table 327 (FIG. 7). Size is set to "50 G", the same as the value of the discrimination table 327.

In the example of FIG. 8, information relating to the volume identified by identifier "#A" is stored. This information is stored in Step Sr910 (FIG. 12) to be described later.

FIG. 9 is an illustration depicting an example of the volume mapping table 325. This volume mapping table 325 stores associations among temporary volume identifiers, normal volume identifiers, data migration status, LUNs, migration pointers, and written sectors (referred to as "write-updated sectors"). In Step Sr440, the area reservation module 321 adds a temporary volume identifier (in the example of FIG. 9, "#1") to the table, and sets data migration status to "before migration." Other information is set later (described in detail later).

Once information relating to the first temporary volume TV1 has been added to the tables 325, 326, 327, in the next Step Sr450 (FIG. 5), the area reservation module 321 (FIG. 1) sends an area reservation completion notification to the management server 200. Once the storage management module 222 receives the area reservation completion notification (Step M260: Yes), the storage management module 222 terminates Step M200. In the event that area reservation completion notification is not received (Step M260: No), the storage management module 222 moves on to Step M270, and executes an error notification process.

FIG. 10 is a flowchart showing the specifics of the procedure of Steps M500 and Sr600 of FIG. 2. In the initial Step M510, the storage management module 222 (FIG. 1) sends a path setup request to the storage system 300. Thereupon, the area reservation module 321 receives the request (Sr610), and in Step Sr620 allocates a LUN to the temporary volume TV1 reserved in Step Sr400 (FIG. 2, FIG. 5). At this time, by referring to the volume mapping table 325 (FIG. 9), a LUN that is not currently in use is found and used. In the event that a LUN not currently in use cannot be found (Step Sr630: No), the area reservation module 321, in Step Sr660, sends an error notification to the management server 200 and terminates Step Sr600.

Once the area reservation module 321 has allocated a LUN, in the next Step Sr640, the area reservation module 321 stores the LUN that has been assigned (allocated LUN) in the volume mapping table 325 (FIG. 9). In the example of FIG. 9, a "0" is assigned as the LUN of the first temporary volume TV1 (#1).

In the next Step Sr650, the area reservation module 321 sends path setup completion notification to the management server 200. At this time the allocated LUN is sent as well. In the event that the storage management module 222 does not receive path setup completion notification (Step S520: No), the storage management module 222 moves on to Step M550 and executes an error notification process. As the error notification process, the same process as in Step M270 (FIG. 5) described previously may be used.

Once the storage management module 222 receives path setup completion notification, in Step M530 the storage management module 222 stores the allocated LUN in the configuration management table 224 (FIG. 6). In the next Step M540, the storage management module 222 sends volume creation completion notification to the task server 100. At this time the allocated LUN is sent as well. Then the storage management module 222 terminates Step M500.

Figure 11:
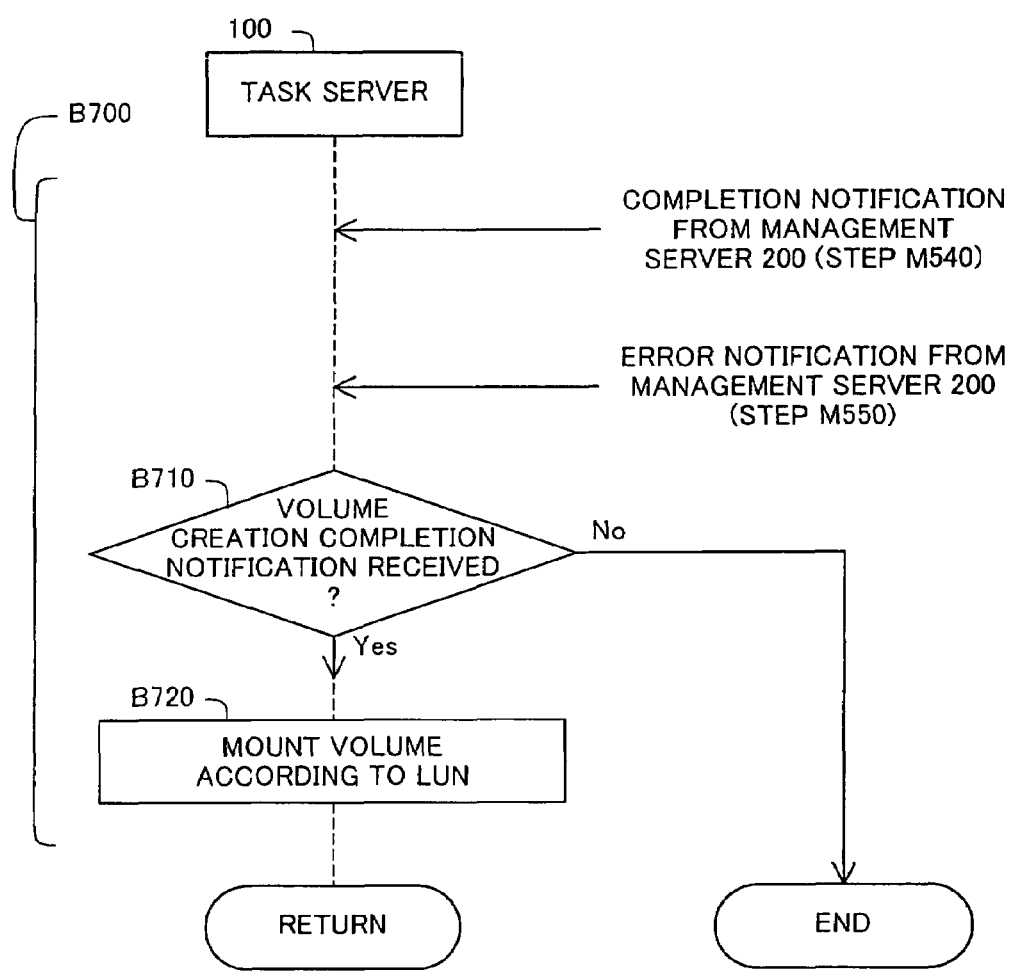
FIG. 11 is a flowchart showing the specific procedure of Step B700 of FIG. 2.

FIG. 11 is a flowchart showing the specific procedure of Step B700 of FIG. 2. In the initial Step B710, the volume manager 122 determines whether volume creation completion notification has been received from the management server 200. In the event that completion notification has not been received, the volume manager 122 terminates the process of Step S700. In the event that completion notification has been received, the volume manager 122, in the next Step S720, executes the mounting process appropriate to the allocated LUN that was received. Subsequently, the task server 100, by means of specifying the WWN of the storage system 300, the allocated LUN, and the sector number (LBA), can access to a storage area (at this stage, the temporary volume TV1) in the storage system 300.

Figure 12:
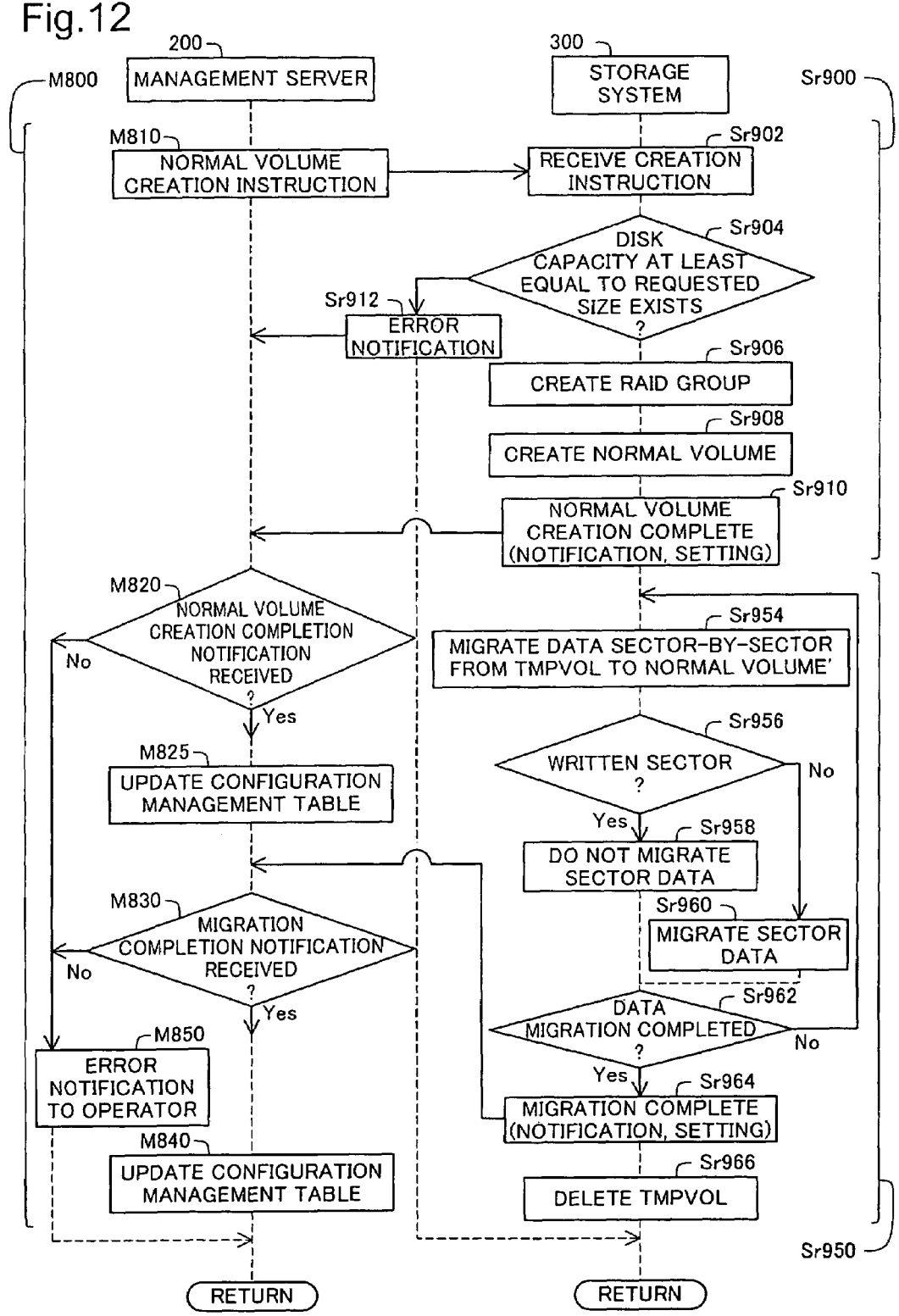
FIG. 12 is a flowchart showing the specific procedure of Steps M800 and Sr900, and Sr950 of FIG. 2.

FIG. 12 is a flowchart showing the specific procedure of Steps M800, Sr900, and Sr950. In the initial Step M810, the storage management module 222 (FIG. 1) sends a normal volume creation instruction to the storage system 300. Thereupon in Step Sr902 the area reservation module 321 receives the creation instruction, and in Step Sr904 it determines whether there is free space sufficient to create a logical volume of the requested size in the disk array 350. In the memory 320, disk utilization status information is stored (not shown). The disk utilization status information represents correspondence between data storage locations in the disk array 350 and information indicating whether or not these are in use. In the event that the size of the free space is not sufficient, in Step Sr912 the area reservation module 321 sends an error notification to the management server 200, and terminates the process of Step Sr950.

In the event that the size of the free space is sufficient, in the next Step S906, the area reservation module 321 creates a RAID group. Specifically, the area reservation module 321 selects one or more disk devices to set up a RAID system. In the next Step Sr908, the volume creation module 322, using the selected disk device(s), creates a normal volume. At this time, the normal volume is created in accordance with the requested RAID level. In the example of FIG. 3B, a first logical volume LV1 is created. This first logical volume LV1 is used as-is in its entirety as a normal volume.

Hereinafter, the first logical volume LV1 will also be referred to as "normal volume NV1."

Once the normal volume NV1 has been created, in Step Sr910, the area reservation module 321 stores information relating to the normal volume NV1 in the identifier convert table 326 (FIG. 8). In the example of FIG. 8, identifier "#A" is allocated to the normal volume NV1. Information relating to the normal volume NV1 is then stored as information relating to the logical volume identified by identifier "#A." Specifically, volume type is set to "normal" and the type of storage area is set to "disk array (logical volume number=1). By setting up a RAID system, a plurality of logical volumes can be created in the disk array 350. Each logical volume in the disk array 350 is identified by a unique logical volume number assigned on a per-volume basis. The logical volume number of the normal volume NV1 is also set in "storage area type" of the identifier convert table 326 (in the example of FIG. 8, to "1"). In the example of FIG. 8, the lead sector is set to "0" and size is set to "50 G." This means that the normal volume NV1 identified by identifier "#A" is a 50 Gbytes storage area beginning at sector #0 of the first logical volume LV1.

The one logical volume created by setting up the RAID system (hereinafter also termed the "parent volume") can be partitioned into a number of partial volumes, and one partial volume can be used as a normal volume. In this case, the lead sector will be set to the sector number of the lead sector of the partial volume, within the parent volume. For example, it would be possible to use a 10 Gbytes partial volume beginning from sector #10000 of the parent volume as a normal volume. In this case, the lead sector would be set to "10000" and the size to "10 G."

In any case, access to each of the temporary volume and the normal volume is carried out using relative sector number with "#0" as the lead sector. Associations among such relative sector numbers and sector numbers in the cache memory 340 or parent volume are stored in memory 320 (not shown).

Additionally, in Step Sr910, the area reservation module 321 stores information relating to the normal volume NV1 in the volume mapping table 325 (FIG. 9). In the example of FIG. 9, "#A" is stored as the normal volume identifier corresponding to the temporary volume identifier "#1."

Once the area reservation module 321 has updated the information in the tables 325, 326, it sends creation completion notification to the management server 200 (Sr910). Upon receipt of completion notification, the storage management module 222, in the next Step M825, changes to "in migration" the migration status associated with the allocated LUN of the configuration management table 224 (FIG. 6). In the event that completion notification is not received, the storage management module 222 moves on to Step M850 and executes an error notification process. A process identical to that of Step M270 (FIG. 5) described earlier may be used as the error notification process.

In the storage system 300, meanwhile, once the area reservation module 321 has sent completion notification, next, the data migration module 323 initiates the data migration process (Sr950).

In Embodiment 1, the data migration module 323 performs data migration on a sector-by-sector basis, in order from the lead sector. In the initial Step Sr954, the data migration module 323 updates the migration target sector. Specifically, the data migration module 323, while increasing the migration target sector number in increments of 1 beginning at "0" (Step Sr954) repeats the process of Steps Sr956-Sr962 described later. In Embodiment 1, data size of one sector is assumed to be the same for both the first temporary volume TV1 and the normal volume NV1 (first logical volume LV1). The sector numbers used here are sector numbers common to the first temporary volume TV1 and the normal volume NV1, and are relative sector numbers derived when "#0" is assigned to the lead sector.

In Step Sr954, the data migration module 323 sets the value of the migration pointer that corresponds to the migration target normal volume (identifier "#A") of the volume mapping table 325 (FIG. 9) to the sector number of the migration target sector. Here, the data migration completed sectors are the sectors before the sector indicated by the migration pointer (the migration target sector). In this way, the migration pointer is used as information for identifying migration completed data (sectors) and before-migration data (sectors).

In the first iteration of Step Sr954, the area reservation module 321 changes to "in migration" the migration status associated with the migration target normal volume (identifier "#A") in the volume mapping table 325 (FIG. 9).

In the next Step Sr956, the data migration module 323 decides whether or not the migration target sector is a written (write-updated) sector. The written sectors mean those sectors among the before-migration sectors whose newest data have been directly written to the normal volume NV1. Such a written sector can be produced when a data update process, i.e. a data write process, is executed during data migration (described in detail later). Such written sectors are recorded in the volume mapping table 325 (FIG. 9). Accordingly, the data migration module 323 makes the decision with reference to the volume mapping table 325.

In the event that the migration target sector is a written (write-updated) sector, the data migration module 323 moves on to Step Sr962 without migrating the data (Step Sr958). In the event that the migration target sector is not a written sector, in Step Sr960, the data migration module 323 reads the data of the migration target sector from the temporary volume TV1 and writes the data to the normal volume NV1. The process then moves on to Step Sr962.

In Step Sr962, the data migration module 323 decides whether or not data migration has been completed for all sectors. In the event it has not been completed, the process returns to Step Sr954, and the process of Step Sr954-Sr962 is repeated.

Once data migration has been completed for all sectors, in the next Step Sr964, the area reservation module 321 changes to "migration completed" the migration status associated with the migration target normal volume (identifier "#A") in the volume mapping table 325 (FIG. 9). It also sends migration completion notification to the management server 200.

In the next Step Sr966, the area reservation module 321 releases the temporary volume TV1 which is no longer being used. Specifically, it deletes information relating to the first temporary volume TV1 from the identifier convert table 326 (FIG. 8) and the discrimination table 327 (FIG. 7). As a result, the area within the cache memory 340 that was occupied by temporary volume TV1 is released and again becomes free space. Thus, it is now possible to use it when the storage system 300 receives a request to provide a new storage area. This "releasing the storage area" means that the setting relating to usage status of the storage area is changes from "in-use" to "unused" status.

In the management server 200, meanwhile, when the storage management module 222 receives migration completion notification, in the next Step M840, the storage management module 222 changes the migration status associated with the allocated LUN of the configuration management table 224 (FIG. 6) to "migration completed." In the event that migration completion notification is not received, the storage management module 222 moves on to Step M850 and executes an error notification process.

Figure 13:
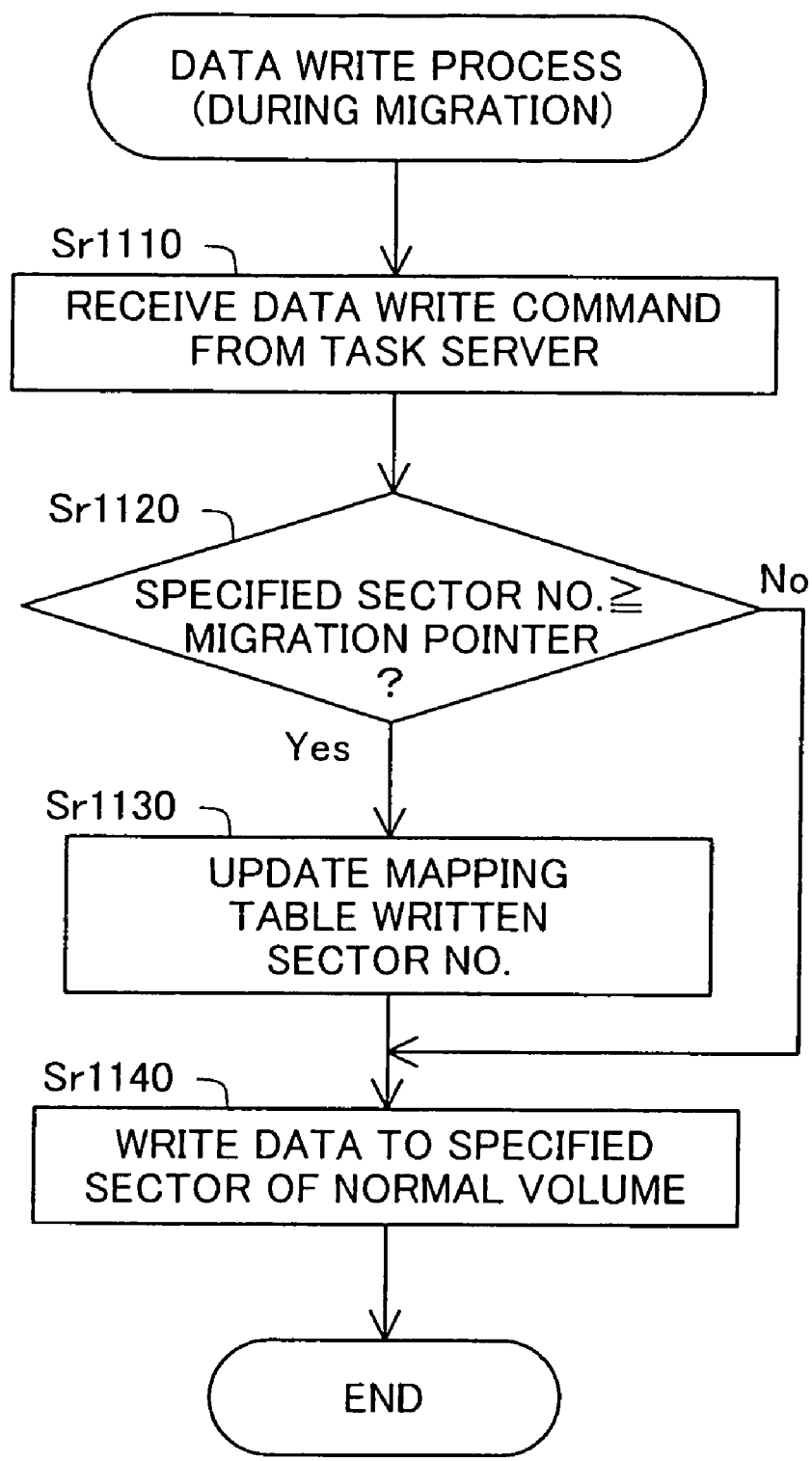
FIG. 13 is a flowchart showing the procedure of a write process during data migration.

A4. Write Process During Migration (Update Process):

FIG. 13 is a flowchart showing the procedure of a write process during data migration. Data update requests, i.e. data write requests, from the task server 100 (FIG. 1) are relayed by the data relay module 324 of the storage system 300. The data relay module 324 refers to the volume mapping table 325 (FIG. 9) and executes a write process depending on the data migration status of the LUN specified by the task server 100. Specifically, in the event that the migration status is "before migration" the data is written to a temporary volume. In the event that the migration status is "migration completed" the data is written to a normal volume. In the event that the migration status is "during migration" the data is written according to the procedure depicted in FIG. 13.

Figure 14:
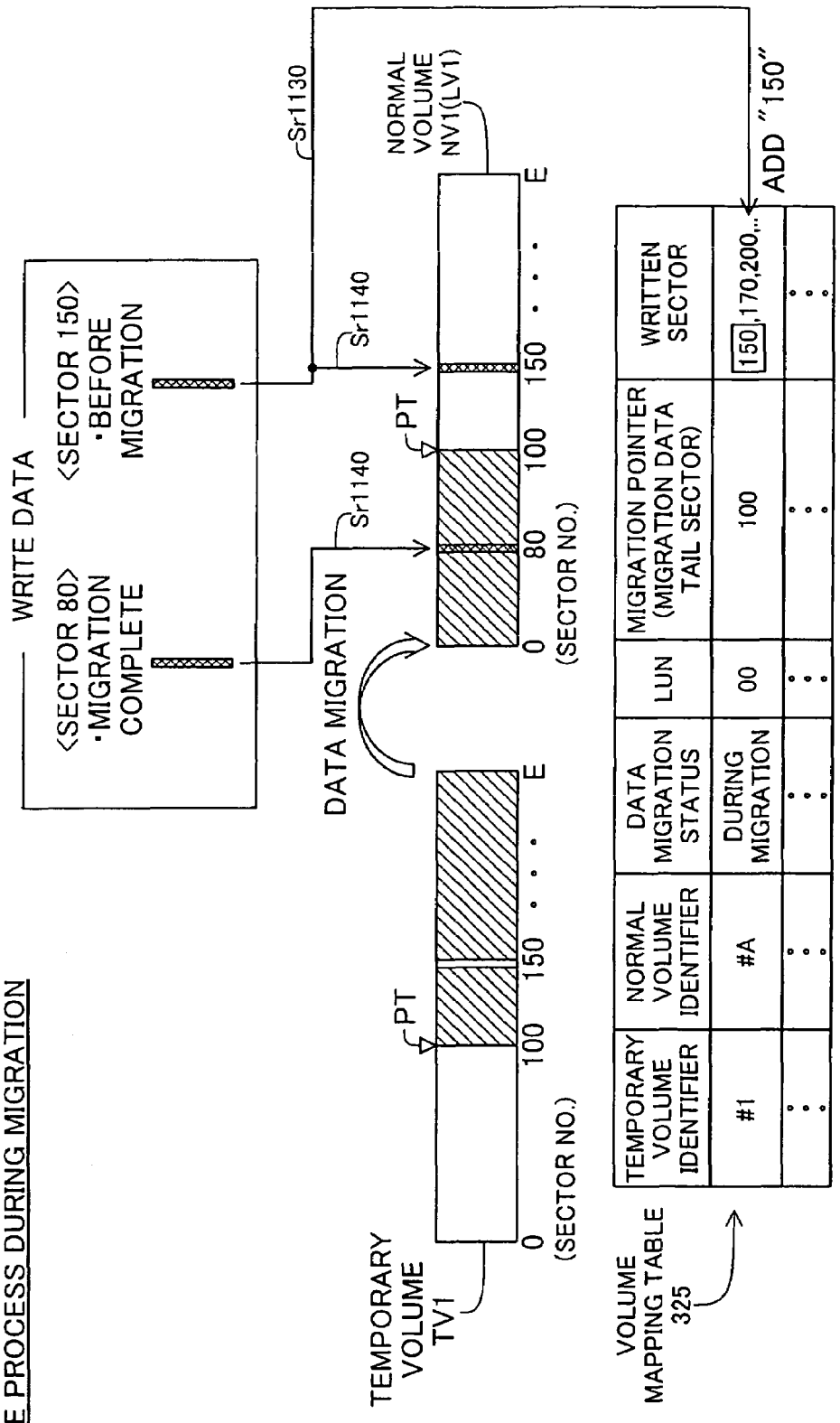
FIG. 14 is a simplified illustration depicting writing of data during migration, by the data relay module 324.

FIG. 14 is a simplified illustration depicting writing of data during migration, by the data relay module 324. In FIG. 14, the first temporary volume TV1, the normal volume NV1, and the volume mapping table 325 are shown. FIG. 14 depicts an instance in which "LUN=0" has been specified by the task server 100, and the migration point of the specified LUN is 100. Sector numbers have been assigned to the volumes TV1, NV1. These sectors numbers are relative sector numbers derived when the number of the lead sector is assigned "#0." Sector numbers are common to both the temporary volume and the normal volume. The final sector number E is determined by the volume size (in Embodiment 1, this is the same as the requested size) and single sector data size.

In the initial Step Sr1110 (FIG. 13), the data relay module 324 receives a data write command from the task server 100. The task server 100 makes a data write request by means of specifying a LUN, a sector number, and write data. Here, the specified sector number is the same as the sector number shown in FIG. 14.

In the next Step Sr1120 (FIG. 13), the data relay module 324 decides whether or not the specified sector number is equal to or greater than the migration pointer. In the event that the specified sector number is smaller than the migration pointer, the data of the specified sector is migration completed. Accordingly, the data relay module 324 moves on to Step Sr1140, and writes the data to the specified sector of the normal volume. FIG. 14 depicts the data relay module 324 writing data of sector number 80. Since sector number 80 is smaller than the migration pointer (100), the data is written to the normal volume NV1.

On the other hand, if the specified sector number is not smaller than the migration pointer, the data of the specified sector is before migration. Accordingly, in the next Step Sr1130 the data relay module 324 adds the specified sector number to the written (write-updated) sectors associated with specified LUNs in the volume mapping table 325. Then, in the next Step Sr1140, the data relay module 324 writes the data to the specified sector of the normal volume. FIG. 14 depicts the data relay module 324 writing data of sector number 150. Since sector number 150 is greater than the migration pointer (100), sector number 150 is added to the written sectors of the volume mapping table 325 (Step Sr1130).

In the above manner, the data relay module 324 executes write processes during migration. As a result, the newest written (write-updated) sector information is stored in the volume mapping table 325. In the event that a write request specifying multiple sectors is received from the task server 100, the data relay module 324 repeatedly executes the process of FIG. 13 sector-by-sector. It would also be acceptable to initially store the data received from the task server 100 in the cache memory 340, and to execute the process of FIG. 13 after write completion notification has been sent to the task server 100. The data relay module 324, referring to the discrimination table 327 (FIG. 7), may store the data in free space not being used as a temporary volume.

Figure 15:
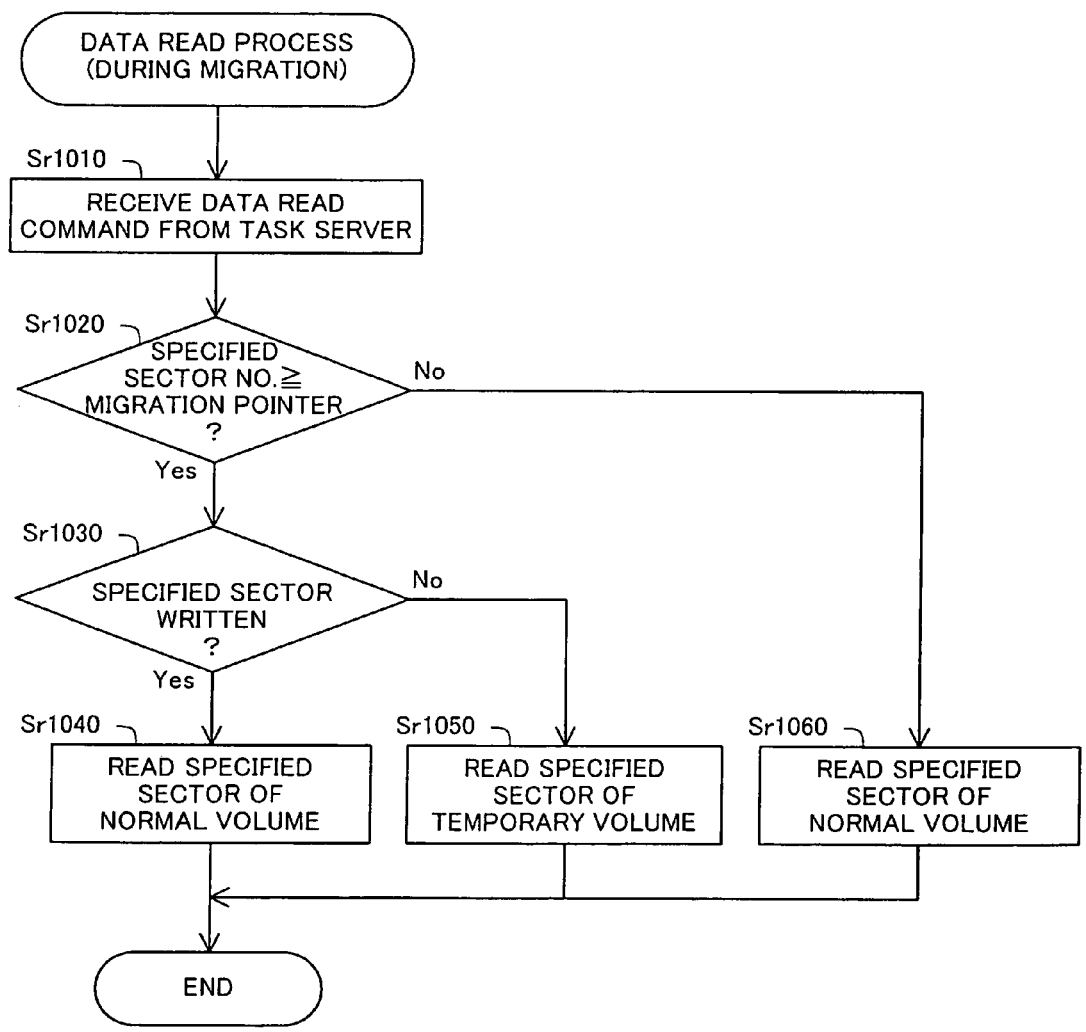
FIG. 15 is a flowchart showing the procedure of a read process during data migration.

A5. Read Process During Migration:

FIG. 15 is a flowchart showing the procedure of a read process during data migration. Data read requests from the task server 100 (FIG. 1) are relayed by the data relay module 324 of the storage system 300. The data relay module 324 refers to the volume mapping table 325 (FIG. 9) and executes a read process depending on the data migration status of the LUN specified by the task server 100. Specifically, in the event that the migration status is "before migration" the data is read from a temporary volume. In the event that the migration status is "migration completed" the data is read from a normal volume. In the event that the migration status is "during migration" the data is read according to the procedure depicted in FIG. 15.

Figure 16:
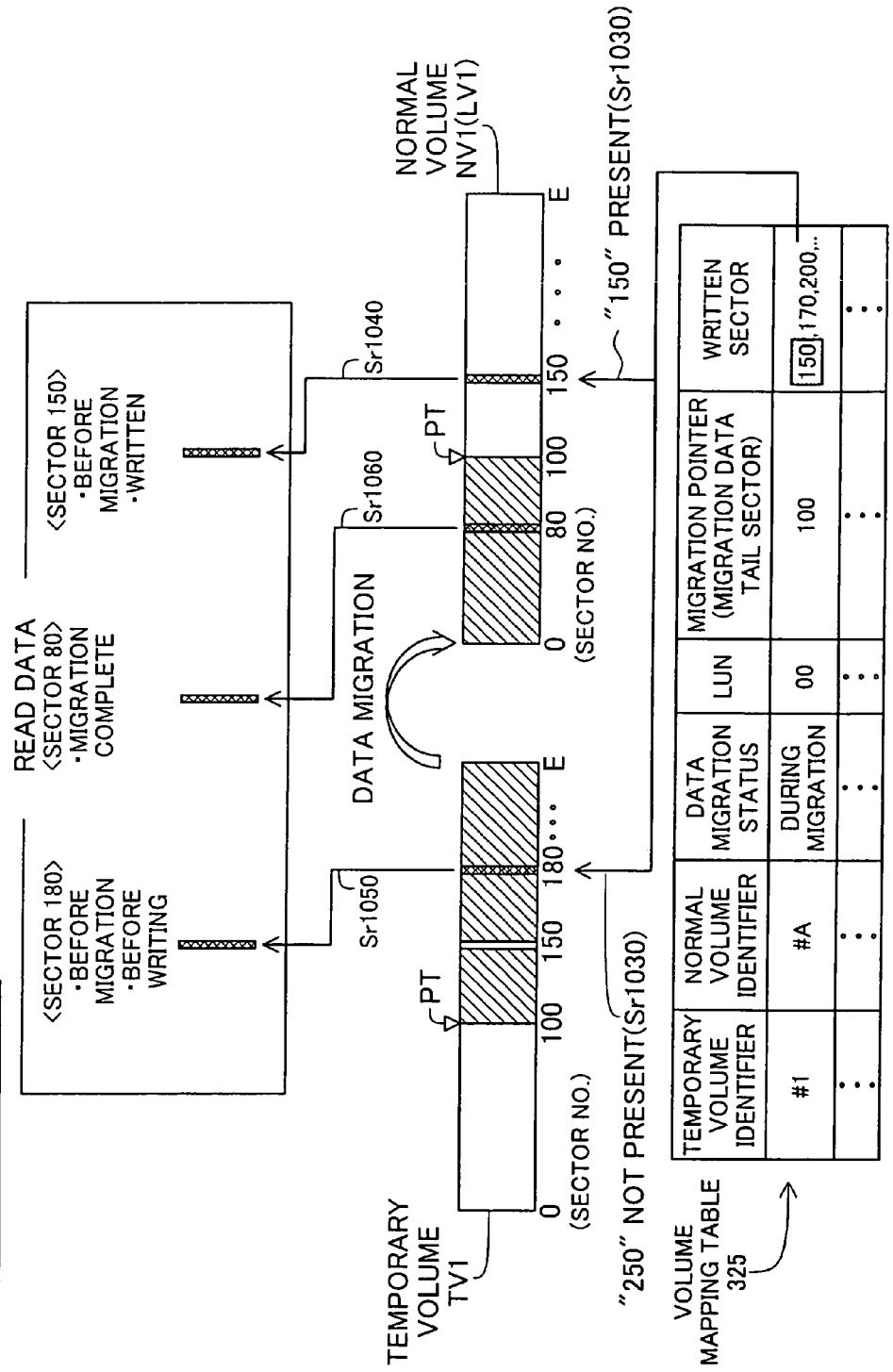
FIG. 16 is a simplified illustration depicting reading of data during migration, by the data relay module 324.

FIG. 16 is a simplified illustration depicting reading of data during migration, by the data relay module 324. In FIG. 16, as in FIG. 14, the first temporary volume TV1, the normal volume NV1, the volume mapping table 325, and sector numbers are shown. FIG. 16 depicts an instance in which "LUN=0" has been specified by the task server 100, and the migration point of the specified LUN is 100.

In the initial Step Sr1010 (FIG. 15), the data relay module 324 receives a data read command from the task server 100. As with a data write request, the task server 100 makes a data read request by means of specifying a LUN and a sector number.

In the next Step Sr1020, the data relay module 324 decides whether or not the specified sector number is equal to or greater than the migration pointer. In the event that the specified sector number is smaller than the migration pointer, the data of the specified sector is migration completed. Accordingly, in Step Sr1060, the data relay module 324 reads the data from the specified sector of the normal volume, and sends the data to the task server 100. FIG. 16 depicts the data relay module 324 reading data of sector number 80. Since sector number 80 is smaller than the migration pointer (100), the data is read from the normal volume NV1 (Step Sr1060).

On the other hand, in the event that the specified sector number is not smaller than the migration pointer, in the next Step S1030 the data relay module 324 decides whether or not the specified sector is a written (write-updated) sector. This decision is made by referring to the volume mapping table (FIG. 16). Where the specified sector is a written sector, the newest data is stored in the normal volume. Accordingly, in Step Sr1040 the data relay module 324 reads the data from the specified sector of the normal volume, and sends it to the task server 100. FIG. 16 depicts the data relay module 324 reading the data of sector number 150. Sector number 150 is included in the written sectors. Accordingly, the data relay module 324 reads the data from the normal volume NV1 (Step Sr1040).

In the event that the specified sector is not a written (write-updated) sector, in the next step Sr1050, the data relay module 324 reads the data from the specified sector of the temporary volume, and sends it to the task server 100. FIG. 16 depicts the data relay module 324 reading the data of sector number 180. Sector number 180 is not included in the written sectors. Accordingly, the data relay module 324 reads the data from the temporary volume TV1 (Step Sr1050).

In the above manner, the data relay module 324 executes read processes during migration. Here, by means of referring to written (write-updated) sector information and the migration pointer stored in the volume mapping table 325, the data relay module 324 can determine whether the newest data of each sector is stored in a temporary volume or a normal volume. Accordingly, even during migration, the data relay module 324 is able to read the newest data for any sector. In the event that a read request specifying multiple sectors is received from the task server 100, the data relay module 324 repeatedly executes the process of FIG. 15 sector-by-sector. It would also be acceptable to initially store read data in the cache memory 340, and to send it all to the task server 100 later. The data relay module 324, referring to the discrimination table 327 (FIG. 7), may store the data in free space not being used as a temporary volume.

In Embodiment 1, the memory 320 of the storage system 300 (FIG. 1) stores volume association information that associates LUNs, temporary volumes, and normal volumes (the volume mapping table 325 (FIG. 9)). By referring to this association information, the data relay module 324 can switch the volume targeted for access, without changing the data transfer path (including the LUN) between the task server 100 and the storage system 300. As a result, increased load on the task server 100 in association with volume switching (e.g. requests to the task server 100 for LUN reset processes) can be avoided.

B. Embodiment 2

Figure 17:
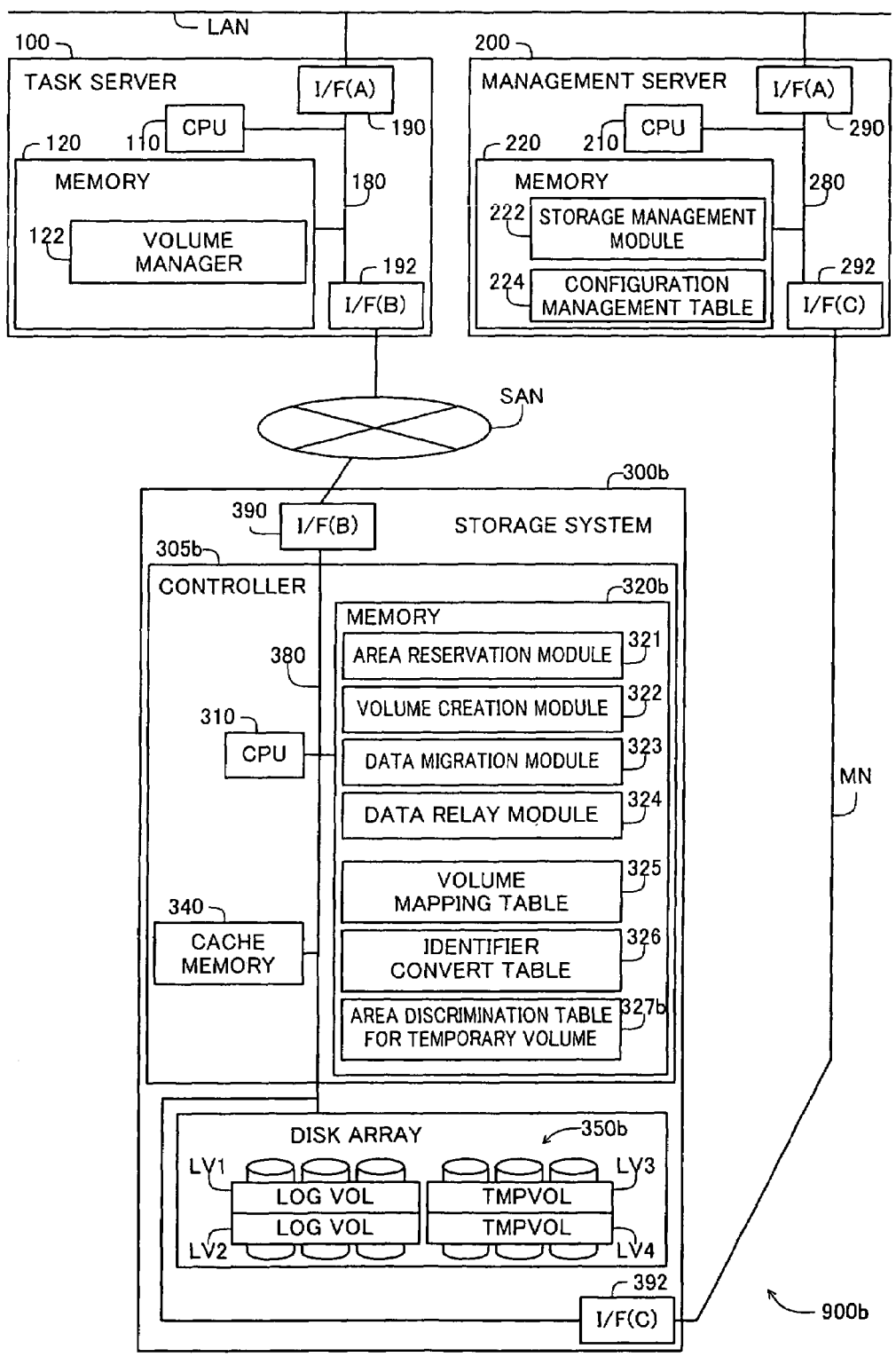
FIG. 17 is an illustration showing the arrangement of the data processing system 900b in Embodiment 2.

FIG. 17 is an illustration showing the arrangement of the data processing system 900b in Embodiment 2. A difference from the data processing system 900 shown in FIG. 1 is that temporary volumes, like normal volumes, are created in the disk array 350b. Additionally, the format of the discrimination table 327b stored in the memory 320b of the controller 305b is different from that of the discrimination table 327 of FIG. 1. Other arrangements and operation of the storage system 300b are the same as in the storage system 300 of Embodiment 1.

FIG. 18 is an illustration depicting an example of the discrimination table 327b in Embodiment 2. A difference from the discrimination table 327 shown in FIG. 7 is that an identification number has been added to associations. The identification number is the logical volume number in the disk array 350b.

The discrimination table 327b of FIG. 18 stores information relating to two temporary volumes TV3, TV4. The third temporary volume TV3 is a 150 Gbytes storage area beginning from sector 0 of the third logical volume LV3 (FIG. 17). The fourth temporary volume TV4 is an 800 Gbytes storage area beginning from sector 0 of the fourth logical volume LV4. These temporary volumes TV3, TV4, i.e. logical volumes LV3, LV4, have been created in advance before the allocation request.

Like a normal volume, it is possible for a single logical volume (parent volume) to be partitioned into a number of partial volumes, and for a single partial volume to be used as a temporary volume. In this case, the lead sector will be set to the sector number of the first sector of the partial volume, in the parent volume.

In Embodiment 2, as in Embodiment 1, the area reservation module 321 reserves a temporary volume in accordance with the procedure depicted in FIG. 5. In Step Sr330, free disk size of the disk array 350*b* is sent together with the free space size of the cache memory 340. Here, free disk size refers to the size of the largest volume among temporary volumes not being used in the disk array 350*b*. The area reservation module 321 acquires free disk size by referring to the discrimination table 327*b* (FIG. 18) and the identifier convert table 326 (FIG. 19; detailed description to follow). Information relating to volumes currently in use is stored in the identifier convert table 326. Accordingly, volumes present among the temporary volumes recorded in the discrimination table 327*b*, but not recorded in the identifier convert table 326, are free spaces. The following description assumes that both of the two temporary volumes TV3, TV4 are unused. In this case, free disk size will be "800 Gbytes."

In Step M240 (FIG. 5), in the event that at least one of the free space size and the free disk size is not smaller than the requested size, the storage management module 222 (FIG. 17) makes a determination of "Yes."

In Step Sr420 (FIG. 5), the area reservation module 321 reserves a temporary volume from among the cache memory 340 and the disk array 350*b*. In Embodiment 2, in the event that free space size of the cache memory 340 is smaller than the requested size, a temporary volume in the disk array 350*b* is selected. The following description assumes that the requested size is 150 Gbytes, and that the area reservation module 321 has selected the third temporary volume TV3.

Once a temporary volume has been selected, in Step Sr440 the area reservation module 321 stores information relating to the selected storage area (third temporary volume TV3) in the identifier convert table 326 (FIG. 17) and the volume mapping table 325.

FIG. 19 is an illustration depicting an example of the identifier convert table 326 in Embodiment 2. Information relating to the third temporary volume TV3 is stored in the identifier convert table 326. Identifier "#2" is allocated to the third temporary volume TV3, with other information being set to the same values as the information of the third temporary volume TV3 established in the discrimination table 327*b* (FIG. 18).

FIG. 20 is an illustration depicting an example of the volume mapping table 325 in Embodiment 2. In the example of FIG. 20, the identifier "#2" has been added.

In the same manner as Embodiment 1, the area reservation module 321 performs path setting in accordance with the procedure shown in FIG. 10. In the example of FIG. 20, "01" is allocated as the LUN of identifier "#2" (third temporary volume TV3). The task server 100 executes the mounting process for the LUN, in accordance with the procedure shown in FIG. 11. Subsequently, by means of specifying this LUN, the task server 100 is able to access the storage area (at this stage, the third temporary volume TV3).

Next, in accordance with the procedure shown in FIG. 12, the volume creation module 322 (FIG. 17) creates a normal volume (Sr908). The following description assumes that the volume creation module 322 creates a second logical volume LV2 (FIG. 17), and that the second logical volume LV2 in its entirety is used as a normal volume (hereinafter termed "second normal volume NV2"). Next, in Step Sr910, the area reservation module 321 stores information relating to the normal volume in the identifier convert table 326 (FIG. 19) and the volume mapping table 325 (FIG. 20).

In the example of FIG. 19, the identifier "#B" is allocated to the second normal volume NV2. Additionally, the storage area type is set to "disk array (logical volume number=2)", the lead sector is set to "0", and the size is set to "150 G." Also, in the example of FIG. 20, the temporary volume identifier "#2" and the normal volume identifier "#B" are associated.

Next, in accordance with the procedure shown in FIG. 12, the data migration module 323 (FIG. 17) executes the data migration process (Sr950). Specifically, data is migrated from the third temporary volume TV3 to the second normal volume NV2. Once data migration is completed, the data relay module 324 switches the access target from the third temporary volume TV3 to the second normal volume NV2.

Once data migration has been completed, in Step Sr966, the area reservation module 321 deletes information relating to the third temporary volume TV3 from the identifier convert table 326 (FIG. 19). As a result, the third temporary volume TV3 is released and again becomes free space. Thus, it is now possible to use it when the storage system 300*b* receives a request to provide a new storage area. The information relating to the third temporary volume TV3 is not deleted from the discrimination table 327*b*, and the released third temporary volume TV3 can be reused as-is. However, it would also be acceptable to delete information relating to the third temporary volume TV3 from the discrimination table 327*b* as well. In this case, the area in the disk array 350*b* where the third temporary volume TV3 was created can be reused to set up a new RAID system.

The write process and read process during migration are the same as in Embodiment 1 described previously (FIGS. 13-16).

In the above manner, the storage system 300*b* of Embodiment 2 can utilize the disk array 350*b*, in addition to the cache memory 340, as a temporary volume. Here, it is acceptable to provide a temporary volume that utilizes the disk array 350*b* only, without utilizing the cache memory 340. Where a temporary volume is created in a disk device, an inexpensive SATA disk may be used for the temporary volume, and a more reliable FC disk may be used for the normal volume. By creating the temporary and normal volumes in different disk devices, convenience during volume usage is improved. Additionally, where no disk in a storage system has the specs (e.g. capacity, RAID level) desired by the user, it would be possible to employ in the meantime a disk device in the storage system to create the temporary volume, and once the user has later added a disk device having the desired specs, to create the normal volume in that disk device. Where the normal volume and the temporary volume are created in different disk devices, it is possible to prevent I/O from being concentrated in a given disk device.

The timing for creating the temporary volume in the disk array 350*b* may be set to any timing coming before the allocation request. For example, it would be acceptable to create the temporary volume in advance prior to shipping of the storage system 300. Alternatively, a predetermined temporary volume may be created automatically by the volume creation module 322, when the storage system 300*b* is started up for the first time. Alternatively, the temporary volume may be created by the volume creation module 322 at timing specified by the user. In this case, the volume creation module 322 would correspond to the "temporary storage area creation unit" in the invention. Such a temporary storage area creation unit may also be provided as a module independent from the volume creation module 322 that creates the normal volumes.

C. Embodiment 3

Figure 21:
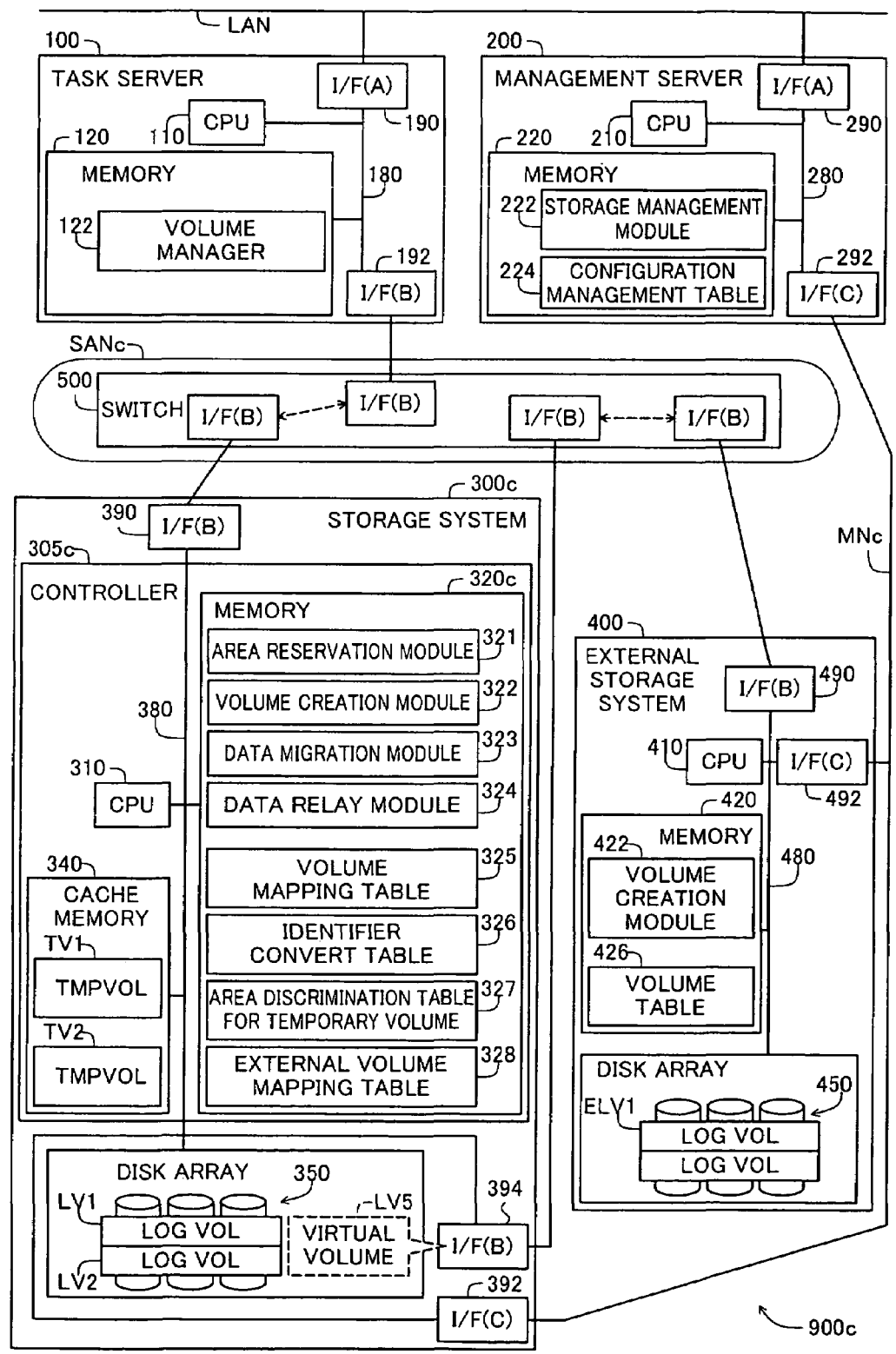
FIG. 21 is an illustration is an illustration showing the arrangement of the data processing system 900c in Embodiment 3.

FIG. 21 is an illustration showing the arrangement of the data processing system 900c in Embodiment 3. A difference from the data processing system 900 shown in FIG. 1 is that an external storage system 400 is connected to the storage system 300c. The normal volume is created in this external storage system 400. The storage system 300c and the external storage system 400 are connected via a storage area network SANc.

The storage system 300c comprises an interface 394 for communication with the external storage system 400. An external volume mapping table 328 is stored in the memory 320c of the controller 305c. Other arrangements are the same as the storage system 300 of Embodiment 1.

The external storage system 400 has a CPU 410, a memory 420, a disk array 450, an interface 490 for communication with the storage system 300c, and an interface 492 for connection to the Management Network MNc. These elements are interconnected via a bus 480. The disk array 450 has a plurality of disk devices. A logical volume is created in the disk array 450. The external storage system 400 provides a storage area (logical volume). The functions of the external storage system 400 are realized by means of execution of programs by the CPU 410. The memory 420 stores the data and programs used by the CPU 410. In particular, the memory 420 has a volume creation module 422 and a volume table 426. The volume creation module 422 is a program executed by the CPU 410. The external storage system 400 will be described in detail later.

The storage area network SANc has a switch 500. The switch 500 has a plurality of interfaces (I/F). The switch 500 is able to selectively interconnect devices connected to the interfaces. In the example of FIG. 21, the task server 100 (interface 192) and the storage system 300c (interface 390) are interconnected. Furthermore, the storage system 300c (interface 394) and the external storage system 400 (interface 490) are interconnected. The switch 500 performs connection using the WWN of each device (interface).

In response to an allocation request, the storage system 300c first provides a temporary volume to the task server 100. The procedure for providing the temporary volume is the same as the procedure of Embodiment 1 described previously (FIGS. 2, 4, 5, 10 and 11). Hereinbelow it is assumed that a first temporary volume TV1 (FIG. 21) is provided. Once provision of the first temporary volume TV1 has been initiated, the management server 200 creates a normal volume in the external storage system 400.

FIG. 22 is a flowchart showing the procedure of the normal volume creation process. Step M800c (Steps M810c, M820c, M850c) of the management server 200 are executed in place of the first half portion (Steps M810, M820, M850) of Step M800 (FIG. 12) of Embodiment 1. A difference from Embodiment 1 is that the instruction target is the external storage system 400, rather than the storage system 300. Meanwhile, Step Sr900c of the external storage system 400 is executed instead of Step Sr900 (FIG. 12) of Embodiment 1. The only difference from Step Sr900 shown in FIG. 12 is that there is an additional process of allocating a LUN (Step S909c); the rest of the process is the same.

In the initial Step M810c, the storage management module 222 (FIG. 21) sends a normal volume creation instruction to the external storage system 400. At this time, the requested size and requested RAID level are sent. Thereupon, the volume creation module 422 (external storage system 400) executes the processes of Steps Sr902c-Sr908c to create the normal volume. These processes are the same as processes Sr902-Sr908 of FIG. 12. In the event of insufficient free capacity in the disk array 450 (Step Sr904c: No), in Step Sr912c, the volume creation module 422 sends error notification to the management server 200 and terminates the process of Step Sr900c.

Hereinbelow it is assumed that the volume creation module 422 creates a first logical volume ELV1 (FIG. 21). This first logical volume ELV1 will also be referred to herein as "external logical volume ELV1" or "external volume ELV1." It is assumed also that the external volume ELV1 in its entirety is used as-is as the normal volume (hereinafter "external normal volume ENV1").

Next, in Step Sr909c, the volume creation module 422 allocates a LUN to the external logical volume ELV1. This LUN is used for the purpose of specifying the external logical volume ELV1 at an access request to the external storage system 400. This LUN is determined independently of the storage system 300c. In Embodiment 3, the storage system 300c utilizes this LUN when accessing the external logical volume ELV1. Hereinafter, this LUN will also be referred to as an external LUN (ELUN). The ELUN establishing process is carried out in the same way as Step Sr620 of FIG. 10. A list of LUNs in use is stored in the memory 420 (not shown).

Once an ELUN is allocated, in the next Step Sr910c (FIG. 22), the volume creation module 422 stores information relating to the external logical volume ELV1 in the volume table 426.

FIG. 23 is an illustration depicting an example of the volume table 426. This volume table 426 stores associations among LUN (ELUN), storage area type, lead sector, and size. The meanings of storage area type, lead sector, and size are the same as in the identifier convert table 326 shown in FIG. 8. In the example of FIG. 23, "03" is allocated as the LUN of the external logical volume ELV1. The external logical volume ELV1 is a 50 Gbytes storage area beginning at sector #0.

In Step Sr910c, the volume creation module 422 sends creation completion notification to the management server 200. The ELUN is also sent at this time. Upon receiving the completion notification, the storage management module 222 executes a mapping process of the external logical volume ELV1.

Figure 24:
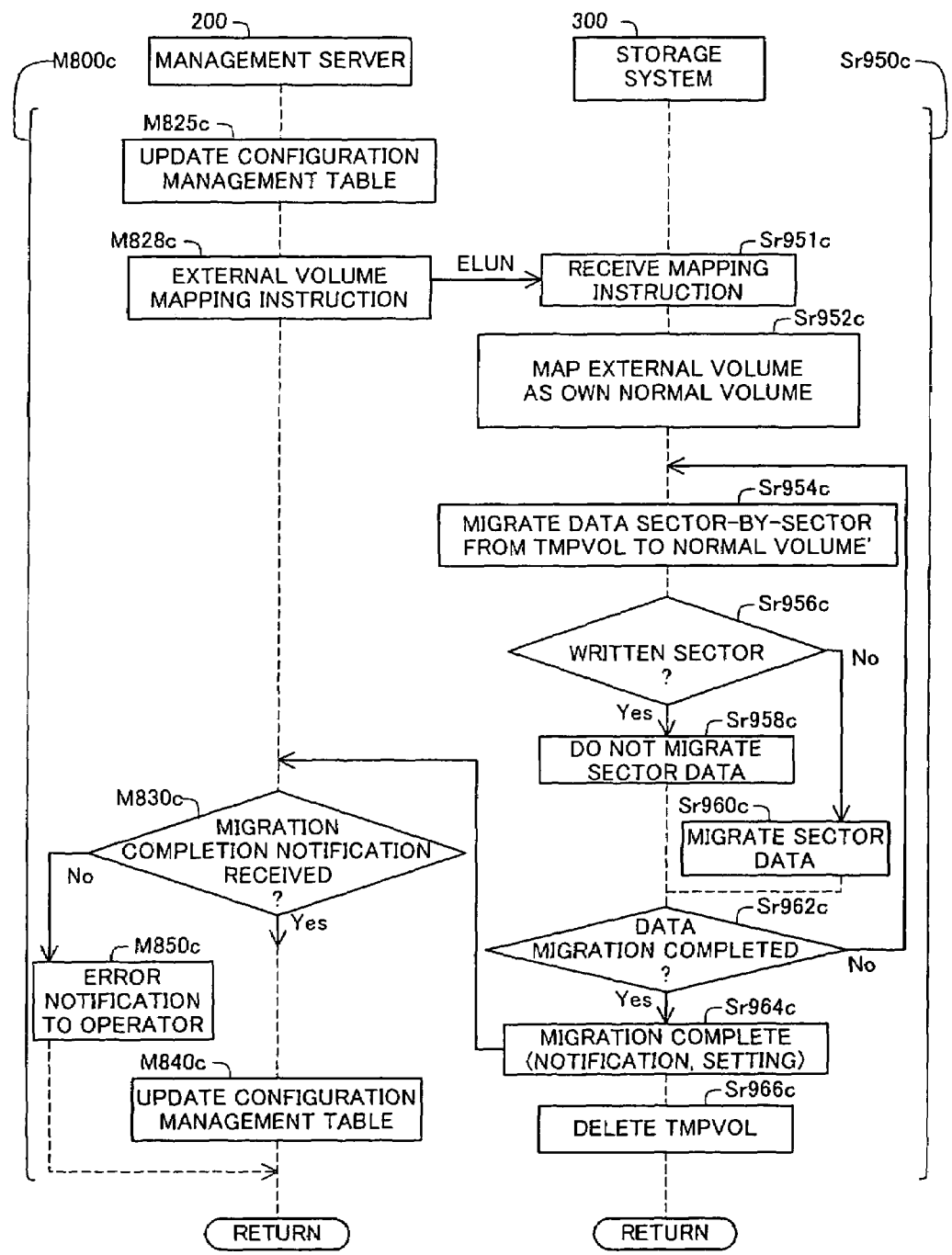
FIG. 24 is a flowchart of the procedure of the mapping process of the external normal volume ENV1.

FIG. 24 is a flowchart of the procedure of the mapping process of the external normal volume ENV1. Step M800c (M825c-M850c) of the management server 200 is executed instead of the latter half portion (M825-M850) of Step M800 (FIG. 12) of Embodiment 1. Meanwhile, Step Sr950c of the storage system 300 is executed instead of Step Sr950 (FIG. 12) of Embodiment 1. The difference from Step Sr950 shown in FIG. 12 is that the migration destination volume from the first temporary volume TV1 is the external normal volume ENV1.

First, in Step M825c, the storage management module 222 changes the migration status associated with the allocated LUN (the LUN associated with the first temporary volume TV1) in the configuration management table 224 (FIG. 6) to "during migration." Then, in Step Sr828c, the storage management module 222 sends a mapping instruction for the external normal volume ENV1 to the storage system 300. The ELUN is also sent at this time.

Next, the area reservation module 321, upon receiving the mapping instruction (Sr951c) maps the external normal volume ENV1 as its own normal volume (Sr952c). Specifically, first, the area reservation module 321 stores information relating to the external normal volume ENV1 in the external volume mapping table 328 (FIG. 21).

FIG. 25 is an illustration depicting an example of the external volume mapping table 328. This external volume mapping table 328 stores associations among internal logical volume number, external port WWN, and external storage system LUN (ELUN). An internal logical volume number is a logical volume number in the storage system 300c. An external port WWN is a VVWN for identifying the external storage system. An external storage system LUN is a LUN (ELUN) for the purpose of identifying a volume of the external storage system. The storage system 300c uses the external volume identified by an external port WWN and an ELUN as a virtual internal volume identified by an internal logical volume number.

In the example of FIG. 25, "5" is allocated as the internal logical volume number of the external normal volume ENV1. That is, the external normal volume ENV1 is used as a fifth logical volume LV5 (FIG. 21) of the storage system 300c. For example, the data relay module 324, upon receiving a request for access to the fifth logical volume LV5, will access the external normal volume ENV1.

Next, the area reservation module 321 stores information relating to the fifth logical volume LV5 (the external normal volume ENV1) in the identifier convert table 326 (FIG. 21). FIG. 26 is an illustration depicting an example of the identifier convert table 326 in Embodiment 3. In the example of FIG. 26, the identifier "#C" is allocated to the fifth logical volume LV5. The information of the fifth logical volume LV5 is then stored as information relating to the volume identified by the identifier "#C." However, lead sector and size are not used.

The area reservation module 321 stores information relating to the fifth logical volume LV5 (the external normal volume ENV1) in the volume mapping table 325 (FIG. 21). FIG. 27 is an illustration depicting an example of the volume mapping table 325 in Embodiment 3. In the example of FIG. 27, "#C" is stored as the normal volume identifier corresponding to temporary volume identifier "#1."

Once mapping is completed, the data migration module 322 executes the data migration process from the first temporary volume TV1 to the external normal volume ENV1. This migration process (Steps Sr954c-Sr962c) is the same as the process Sr954-Sr962 of FIG. 12. However, the migration destination volume is the external normal volume ENV1.

Once migration of all sectors has been completed, in the next Step Sr964c, the area reservation module 321 changes the migration status of the volume mapping table 325 (FIG. 27) to "migration completed", and sends migration completion notification to the management server 200. In the next Step Sr966c, the area reservation module 321 deletes the first temporary volume TV1. This deletion process is the same as Step Sr966 of FIG. 12.

Subsequently, the data relay module 324 (FIG. 21) relays an access by an access requests from the task server 100 specifying the allocated LUN (the LUN allocated to the first temporary volume TV1; in the example of FIG. 27, "00") to the fifth logical volume LV5, i.e. the external normal volume ENV1.

In the management server 200, the storage management module 222 executes processes depending on whether migration completion notification has been made (FIG. 24: M830c-M850c). These processes are the same as processes M830-M850 of FIG. 12.

In the above manner, in Embodiment 3, the storage system 300c is able to utilize a volume created in the external storage system 400 as a normal volume. Accordingly, even in the event of insufficient free capacity of the disk array 350 of the storage system 300c, it is nevertheless possible to provide a normal volume simply by connecting an external storage system 400.

In the example of Embodiment 3, the memory 320c of the storage system 300c (FIG. 21) stores LUN and external volume associations (the volume mapping table 325 (FIG. 27), the identifier convert table 326 (FIG. 26), and the external volume mapping table 328 (FIG. 25) in their entirety). Accordingly, by means of referring to these associations, the data relay module 324 can switch the access target volume from a temporary volume of the storage system 300c to a normal volume of the external storage system 400, without changing the data transfer path between the task server 100 and the storage system 300c. As a result, increased load on the task server 100 in association with volume switching (e.g. requests to the task server 100 for LUN reset processes) can be avoided.

In Embodiment 3, the storage system 300c may provide a temporary volume before the external storage system 400 is connected to the storage area network SANc, or before the external storage system 400 is started up. Typically, it is acceptable to provide the temporary volume before communication of the storage system 300c with the external storage system 400 is enabled. By so doing, even in the event that setting up the external storage system 400 takes time, the task server 100 can utilize the temporary volume without having to wait for the external storage system 40 to be set up. As a result, the time needed to provide a storage area to the task server 100 can be reduced. Here, the storage system 300c may migrate the data after communication with the external storage system 400 has become possible.

D. Variants

Of the elements in the embodiments hereinabove, elements other than those claimed in independent claims are supplemental elements, and may be omitted where appropriate. The invention is not limited to the embodiments set forth herein, and may be reduced to practice in various other ways without departing from the spirit thereof, such as the following variants.

Variant 1:

The method of data access during migration is not limited to the method shown in FIGS. 13-16, it being possible to use any of various other methods. For example, in the data read process during migration of FIGS. 15, 16, even where the specified sector is a migration completed sector, data may be read from the temporary volume in the event that the sector is not a written (write-updated) sector. For example, in the example of FIG. 16, the data of sector #80 may be read from the temporary volume TV1. However, for migration completed sectors, where data is read from the normal volume NV1 as in Embodiment 1, it becomes possible to release the migration completed partial area of the temporary volume TV1 for another application during migration.

It would also be possible to employ a method such as the following, as the method of data access during migration. For example, as the data write process during migration, it would be possible to employ a process wherein the data relay module 324 (FIG. 1) always writes to a temporary volume, and with regard to migration completed sectors, additionally writes to a normal volume. Here, as the data read process during migration, it is acceptable to employ a process whereby the data relay module 324 always read from the temporary volume. After migration has been completed, the data relay module 324 may then use the normal volume as the access target, as in the embodiments described previously. Here, by employing as the storage device for creating the temporary volumes a device having faster read speed (e.g. cache memory (semiconductor memory)) than a storage device for creating the normal volumes (e.g. hard disk device), it is possible to avoid a drop in data read speeds even during migration.

However, it is also acceptable to employ, as the write process during migration, a process whereby the data relay module 324 writes data to normal volumes only. By so doing, it is possible to avoid a drop in data write process speed even during migration.

Variant 2:

In the preceding embodiments, allocation requests are made by the task server 100 (FIG. 2, FIG. 4: Step B100), but it would be possible for allocation requests to be made by some other device. For example, allocation requests may be made by the management server 200, in accordance with operator instruction. Here, the process beginning with Step M200 of FIG. 2 may be executed by means of control of the management server 200 by the operator. The requested size and the requested RAID level may be specified by the operator. Settings are not limited to these, and the operator may specify other settings relating to volumes (including temporary volumes and normal volumes). For example, disk devices for creating the normal volume and the temporary volume may be specified by the operator. Also, where it is possible to utilize several temporary volumes, the temporary volume to be used may be specified by the operator.

Variant 3:

In the preceding embodiments, the size of the temporary volume need not be the same as the requested size. For example, it may be larger than the requested size.

In certain instances, the amount of data stored in a storage area may be smaller than the requested size at the outset when provision of the storage area is initiated. In such an instance, the size of the temporary volume may be smaller than the requested size. Here, access to the temporary volume may be carried out as follows. The data relay module 324 (FIG. 1, FIG. 17, FIG. 21) stores in the temporary volume only data of the sector for which the write request has been made. At this time, the data relay module 324 stores sector association in the memory 320, 320b, 320c. The sector association represents correspondence between sector numbers for writing specified by the task server 100 (FIG. 1, FIG. 17, FIG. 21) (hereinafter termed the "write specified sector number") and actual sector numbers in the temporary volume. In response to a read request, the data relay module 324 refers to the sector association, and reads the data of the sector specified to be read out. When data is being migrated, the data migration module 323 refers to the sector association, and stores the data read from the temporary volume in the sector specified by the write specified sector number of the normal volume. In this case, in preferred practice, migration to the normal volume will be completed before the amount of write-requested data (sector) exceeds the size of the temporary volume.

In the preceding embodiments, the data size of a single sector may differ between the temporary volume and the normal volume. In this case, associations between sectors of the temporary volume and sectors of the normal volume may be stored in advance in the memory 320, 320b, 320c. By so doing, the data migration module 323 and the data relay module 324 may carry out reading and writing of data appropriately, making reference to these associations.

Variant 4:

In the preceding embodiments, there are instances in which the storage system 300, 300b, 300c provides logical volumes to a number of task servers. In such an instance, in preferred practice, volume mapping tables 325 (FIG. 9, FIG. 20, FIG. 27) will be provided on an individual task server basis. Here, for a logical volume not recorded in the volume mapping table 325 for a particular task server, data transfer with that task server will preferably be prohibited. By so doing, unintentional data transfer with the task server can be avoided.

Variant 5:

In the preceding embodiments, a method using a RAID 5 system is employed as the method of creating the normal volume, but it would be possible to instead employ a method using some other RAID level. There is no limitation to a method using a RAID system, it being possible to employ any method for creating a volume by means of executing a data write process.

It is possible meanwhile to employ any method as the method for creating the temporary volume. For example, a storage area provided by a single disk device may be utilized as-is as a single temporary volume. In the preceding embodiments, the temporary volume (e.g. temporary volume TV1) created in the cache memory 340 (FIG. 1, FIG. 17, FIG. 21) does not have data redundancy; however, it may instead have data redundancy. For example, using a method identical to the method of setting up a RAID system using disk devices, temporary volumes having data redundancy may be created in the cache memory 340.

In preferred practice, where the normal volume is created using a RAID system, the temporary volume will be created using a RAID system of the same RAID level. By so doing, data migration can be carried out easily. Here, the RAID level of the temporary volume may be preset to a certain RAID level that is used frequently (e.g. RAID 5). Alternatively, it would be acceptable to set up in advance a number of temporary volumes having mutually different RAID levels, and to select a temporary volume of the same RAID level to use.

Variant 6:

Data storage devices for creating logical volumes are not limited to the disk devices (also called hard disk devices) mentioned previously or the cache memory (semiconductor memory) mentioned previously, it being possible to use storage devices of various kinds. For example, flash memory or other types of writeable semiconductor memory may be used; furthermore writable DVDs or magnetooptical disks may be used.

Variant 7:

In the embodiments hereinabove, some of the arrangements realized through software may be substituted with hardware, and conversely some of the arrangements realized through hardware may be substituted with software. For example, the functions of the data relay module 324 (FIG. 1) may be realized by means of a hardware circuit having a logic circuit.

Variant 8:

In the preceding embodiments, the access point information for specifying access point is not limited to a LUN, it being possible to employ any information that identifies the normal storage area. The information utilized to associate the access point information with storage areas (temporary storage areas and normal storage areas) is not limited to the information used in the embodiments hereinabove (e.g.

information stored in the discrimination table 327 (FIG. 7), the identifier convert table 326 (FIG. 8), and the volume mapping table 325 (FIG. 9)), it being possible to use various other kinds of information.

Migration data information is not limited to migration pointer (FIG. 14, FIG. 16), it being possible to utilize any information that identifies data before migration, present in a temporary storage area. Likewise, update data information is not limited to written (write-updated) sector numbers (FIG. 14, FIG. 16), it being possible to utilize any information that identifies updated data during migration, present in a normal storage area.

Variant 9:

In the preceding embodiments, some or all of the functions of the management server 200 (FIG. 1, FIG. 17, FIG. 21) may instead be executed by the controller 305, 305b, 305c. The management server 200 may be dispensed with as well. In this case, it would be possible to employ an arrangement whereby the task server 100 makes allocation requests to the storage system 300, 300b, 300c (controller 305, 305b, 305c). Alternatively, it would be possible to employ an arrangement whereby the storage system 300, 300b, 300c provides the storage area by means of the operator controlling the storage system 300, 300b, 300c.

Variant 10:

In the preceding embodiments, the computer system is composed with a storage system and a task server; however, the computer system may be composed with a storage system alone. For example, in Embodiment 1 depicted in FIG. 1, the computer system may be composed with the storage system 300 and the management server 200 only. Alternatively, the computer system may be composed with the storage system 300 only. In this case, in preferred practice all of the functions of the management server 200 will be executed by the controller 305. The above is applicable as well to Embodiment 2 depicted in FIG. 12. In Embodiment 3 depicted in FIG. 21, the computer system may be composed with the storage system 300c, the external storage system 400, and the management server 200 only. Alternatively, the computer system may be composed with the storage system 300c and the management server 200 only. Alternatively, the computer system may be composed with the storage system 300c only. In this case, in preferred practice all of the functions of the management server 200 will be executed by the controller 305c.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer system comprising:
   a storage system that provides a host computer with a storage area that stores data,
   wherein the storage system comprises:
      a first data storage unit having a temporary storage area which is prepared in advance for the purpose of being provided to the host computer;
      a storage area setup unit that associates the temporary storage area with access point information for specifying an access point for the host computer in response to a given storage area allocation request, prior to completion of a process of creating a normal storage area within a second data storage unit in response to the allocation request, the access point information to be used by the host computer to access the normal storage area;
      a data relay unit that relays an access by an access request including the access point information from the host computer to the temporary storage area associated with the access point information, prior to completion of the normal storage area creation process; and
      a data migration unit that migrates data in the temporary storage area to the normal storage area after completion of the normal storage area creation process,
      wherein the storage area setup unit, after completion of the migration, switches an association of the access point information from the temporary storage area to the normal storage area, such that the normal storage area is associated with the access point information, and
      wherein the data relay unit, after completion of the migration, relays an access by an access request including the access point information from the host computer to the normal storage area associated with the access point information.

2. A computer system according to claim 1, wherein the storage system further comprises:
   a migration information storage unit that stores migration information that includes migration data information and update data information, the migration data information identifying pre-migration data present in the temporary storage area from among data to be stored in the normal storage area,
   wherein the update data information identifies updated during the migration present in the normal storage area,
   wherein the data migration unit migrates in increments the data to be migrated, while updating the migration data information, when the data relay unit receives a data write request from the host computer including the access point information during the migration,
   wherein the data relay unit writes the data to the normal storage area, and appends information identifying the written data as updated data to the update data information, and when the data relay unit receives a data read request from the host computer including the access point information during the migration, the data relay unit refers to the migration information to acquire information relating to read-targeted data which is data to be read, and
   (i) if the read-targeted data is the updated data, the data relay unit reads the read-targeted data from the normal storage area and sends the read-targeted data to the host computer, and
   (ii) if the read-targeted data is not the updated data and has not yet been migrated, the data relay unit reads the read-targeted data from the temporary storage area and sends the read-targeted data to the host computer.

3. A computer system according to claim 1, wherein the storage area setup unit, after completion of the migration, releases the temporary storage area without waiting for a next storage area allocation request.

4. A computer system according to claim 1, wherein the storage system further comprises:
   a temporary storage area creation unit that creates the temporary storage area in the first data storage unit, without waiting for the storage area allocation request.

5. A computer system according to claim 1, wherein the storage system further comprises:

an interface that carries out communication with the second data storage unit, wherein the storage area setup unit, before communication with the second data storage unit is enabled, associates the access point information with the temporary storage area, and wherein the data relay unit, before communication with the second data storage unit is enabled, relays an access by an access request including the access point information from the host computer to the temporary storage area associated with the access point information.

6. A computer system according to claim 1, wherein the storage system further comprises:
   a management device that is connected to the storage area setup unit,
   wherein the management device sends to the storage area setup unit an instruction to execute association of the access point information with the temporary storage area.

7. A computer system according to claim 1, further comprising the host computer.

8. A storage system for providing a host computer with a storage area that stores data comprising:
   a CPU;
   a temporary storage unit having a temporary storage area which is prepared in advance for the purpose of being provided to the host computer;
   a plurality of disk devices; and
   a host interface that carries out data communications with the host computer,
   wherein the CPU is connected to the temporary storage unit, the plurality of disk devices, and the host interface, respectively, and the CPU executes steps of:
      associating the temporary storage area with access point information for specifying an access point for the host computer in response to a given storage area allocation request, prior to completion of a process of creating a normal storage area within the plurality of disk devices in response to the allocation request, the access point information to be used by the host computer to access the normal storage area;
   accessing the temporary storage area associated with the access point information in response to an access request including the access point information from the host computer, prior to completion of the normal storage area creation process;
      migrating data in the temporary storage area to the normal storage area after completion of the normal storage area creation process;
      after completion of the migration, switching an association of the access point information from the temporary storage area to the normal storage area, such that the normal storage area is associated with the access point information; and
      after completion of the migration, accessing the normal storage area associated with the access point information in response to an access request including the access point information from the host computer.

9. A storage system according to claim 8, further comprising:
   a migration information memory that stores migration information that includes migration data information and update data information,
   the migration data information identifying pre-migration data present in the temporary storage area from among data to be stored in the normal storage area,
   the update data information identifying data updated during the migration present in the normal storage area,
   wherein the CPU further executes steps of:
      migrating in increments the data to be migrated, while updating the migration data information;
      responsive to a data write request from the host computer including the access point information during the migration, writing the data to the normal storage area, and appending information identifying the written data as updated data to the update data information;
      responsive to a data read request from the host computer including the access point information during the migration, referring to the migration information to acquire information relating to read-targeted data which is data to be read, and
         (i) if the read-targeted data is the updated data, reading the read-targeted data from the normal storage area, and sending the read-targeted data to the host computer, and
         (ii) if the read-targeted data is not the updated data and has not yet been migrated, reading the read-targeted data from the temporary storage area, and sending the read-targeted data to the host computer.

10. A storage system according to claim 8, wherein the CPU, after completion of the migration, executes releasing the temporary storage area without waiting for a next storage area allocation request.

11. A storage system according to claim 8, wherein the CPU executes creating the temporary storage area in the temporary storage unit, without waiting for the storage area allocation request.

12. A storage system according to claim 8 further comprising:
   a storage interface that carries out communication with another storage system, the storage interface being connected via a network with the other storage system, the other storage system being able to provide a storage area that stores data utilized by the host computer,
   wherein the CPU executes steps of:
      associating the access point information with the temporary storage area before the other storage system is enabled to provide the storage area via the storage interface; and
      accessing the temporary storage area associated with the access point information in response to an access request including the access point information from the host computer, before the other storage system is enabled to provide the storage area via the storage interface.

13. A storage system according to claim 8, wherein the temporary storage unit is a disk device.

14. A storage system according to claim 8, wherein the temporary storage unit is semiconductor memory.

15. A method of providing a host computer with a storage area that stores data, using a storage system comprising a first data storage unit having a temporary storage area which is prepared in advance for the purpose of being provided to the host computer, comprising the steps of:
   (A) associating the temporary storage area with access point information for specifying an access point for the host computer in response to a given storage area allocation request, prior to completion of a process of creating a normal storage area within a second data storage unit in response to the allocation request, the access point information to be used by the host computer to access the normal storage area;

(B) relaying an access by an access request including the access point information from the host computer to the temporary storage area associated with the access point information, prior to completion of the normal storage area creation process;

(C) migrating data in the temporary storage area to the normal storage area after completion of the normal storage area creation process;

(D) after completion of the migration, switching an association of the access point information from the temporary storage area to the normal storage area, such that the normal storage area is associated with the access point information; and (E) relaying an access by an access request including the access point information from the host computer to the normal storage area associated with the access point information, after completion of the migration.

16. A method according to claim 15, wherein the step (C) further includes migrating in increments the data to be migrated, while updating migration data information, the migration data information identifying pre-migration data present in the temporary storage area from among data to be stored in the normal storage area, and wherein the method further comprises the steps of:

(F) responsive to a data write request from the host computer including the access point information during the migration, writing the data to the normal storage area, and appending information identifying the written data as updated data to update data information, the update data information identifying data updated during the migration present in the normal storage area; and (G) responsive to a data read request from the host computer including the access point information during the migration, referring to the migration data information and the update data information to acquire information relating to read-targeted data which is data to be read, and (i) if the read-targeted data is the updated data, reading the read-targeted data from the normal storage area, and sending the read-targeted data to the host computer, and (ii) if the read-targeted data is not the updated data and has not yet been migrated, reading the read-targeted data from the temporary storage area, and sending the read-targeted data to the host computer.

17. A method according to claim 15, further comprising the step of after completion of the migration, releasing the temporary storage area without waiting for a next storage area allocation request.

* * * * *